(12) United States Patent
Hata et al.

(10) Patent No.: US 8,306,045 B2
(45) Date of Patent: Nov. 6, 2012

(54) PACKET FORWARDING APPARATUS AND METHOD FOR DISCARDING PACKETS

(75) Inventors: Akihiro Hata, Kawasaki (JP); Hiroshi Tomonaga, Kawasaki (JP); Katsumi Imamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 12/361,655

(22) Filed: Jan. 29, 2009

(65) Prior Publication Data
US 2009/0257441 A1 Oct. 15, 2009

(30) Foreign Application Priority Data
Apr. 15, 2008 (JP) ................................. 2008-105684

(51) Int. Cl.
*G06F 3/00* (2006.01)
*G06F 5/00* (2006.01)
*H04L 12/28* (2006.01)
*H04L 12/56* (2006.01)
(52) U.S. Cl. ............. 370/413; 370/412; 710/52; 710/56
(58) Field of Classification Search .................. 370/412, 370/413; 710/52, 56
See application file for complete search history.

(56) References Cited

U.S. PATENT DOCUMENTS

| | | | |
|---|---|---|---|
| 6,247,058 B1 | 6/2001 | Miller et al. | |
| 6,788,682 B1 * | 9/2004 | Kimmitt | 370/389 |
| 2002/0064186 A1 * | 5/2002 | Aoyagi et al. | 370/521 |
| 2002/0181484 A1 * | 12/2002 | Aimoto | 370/413 |
| 2004/0049613 A1 * | 3/2004 | Kim et al. | 710/52 |
| 2006/0056542 A1 * | 3/2006 | Ardichvili et al. | 375/316 |
| 2006/0242338 A1 | 10/2006 | Kootstra et al. | |
| 2007/0189262 A1 | 8/2007 | Kim et al. | |
| 2008/0240139 A1 * | 10/2008 | Kodialam et al. | 370/412 |

FOREIGN PATENT DOCUMENTS

| | | |
|---|---|---|
| EP | 2050236 | 4/2009 |
| JP | 5-207063 | 8/1993 |
| WO | 2008/016848 | 2/2008 |

OTHER PUBLICATIONS

United Kingdom Search Report dated May 12, 2009, from the corresponding United Kingdom application.

* cited by examiner

*Primary Examiner* — Ayaz Sheikh
*Assistant Examiner* — Tarell Hampton
(74) *Attorney, Agent, or Firm* — Fujitsu Patent Center

(57) ABSTRACT

The packet forwarding apparatus of the present invention includes a packet buffer for temporarily storing packets to be forwarded, a timer for measuring the time of every predetermined unit period, a plurality of first queues corresponding to each of a plurality of address groups that form the packet buffer, a plurality of second queues that are provided corresponding to the property of the packets, a first controller for executing the writing of the packets, and a second controller for executing the discarding of the packets. According to this invention, through managing the first queues and the second queues, packets in the packet buffer can be discarded without the packets being read from the packet buffer.

7 Claims, 18 Drawing Sheets

| Write period | Packet queue | Front pointer (FP) of this period | Last pointer (LP) of the previous period | Number of packets written (W_num) in the previous period |
|---|---|---|---|---|
| WP1 (1ms) | Qa | | | |
| | Qb | | | |
| | Qc | | | |
| | ⋮ | | | |
| WP2 (1ms) | Qa | P_17 | P_4 | 2 |
| | Qb | | | |
| | Qc | | | |
| | ⋮ | | | |
| ⋮ | ⋮ | | | |
| WP128 (1ms) | Qa | | | |
| | Qb | | | |
| | Qc | | | |
| | ⋮ | | | |

Write Management Table 50 (WMT)

Data recording direction ↓

Fig. 5

Delay Threshold Memory Table 22 (DTT)

| Packet queue | Delay threshold (ms) |
|---|---|
| Qa | D1 |
| Qb | D2 |
| Qc | D3 |
| ⋮ | ⋮ |

PACKET FORWARDING APPARATUS AND METHOD FOR DISCARDING PACKETS

CROSS-REFERENCE TO RELATED APPLICATIONS

This application is based upon and claims the benefit of priority of the prior Japanese Patent Application No. 2008-105684, filed on Apr. 15, 2008, the entire contents of which are incorporated herein by reference.

FIELD

The present invention relates to a switch and the like disposed in an IP (Internet Protocol) network, for example, and a packet forwarding apparatus for performing the forwarding process of packets. More specifically, the present invention relates to a technology for discarding packets that reside or reside exceeding a predetermined period of time in a packet buffer inside a packet forwarding apparatus.

BACKGROUND

In an IP network, a traffic exceeding the data forwarding capacity (band) of a packet forwarding apparatus is expected to be inputted in the packet forwarding apparatus of routers, switches, and the like for relaying packets. For this reason, a packet buffer for temporarily storing packets is provided in a packet forwarding apparatus, and normally a traffic exceeding the transferable capacity of the apparatus is controlled to be held in the packet buffer.

Meanwhile, if a packet including data of highly real-time audio data, motion picture data, or the like, is held for a long period of time in the packet buffer and is transferred, this packet may be discarded at the side of a receiving terminal that is a subsequent stage of the packet forwarding apparatus. This is because the reproduction of the data included in the packet that arrives late is sometimes judged to be unnecessary in a higher layer at the receiving terminal for processing the highly real-time data. This means that, by the packet being sent late due to the packet forwarding apparatus, the band of the network from the packet forwarding apparatus to the receiving terminal is used purposelessly, and it becomes a serious problem especially if the network is congested.

In order to avoid the problem concerned, a control is performed for measuring the residence period of packets in a packet forwarding apparatus, and discarding the packets with residence periods exceeding a predetermined threshold. As a conventional method for controlling and discarding packets, with a packet exchange equipment (packet forwarding apparatus) disclosed in Japanese Laid-open Patent Publication No. 05-207063, the difference between the arrival (input) time and transmit (output) time of a packet (in other words, the residence period of a packet) is described in a control field of packets, and based on the control field, an apparatus ("PAD" in the publication) of a subsequent stage of the packet exchange equipment discards packets that delayed for a predetermined period of time.

SUMMARY

With a conventional packet forwarding apparatus like the one disclosed in the above described Japanese Patent Application Publication No. 1993(H5)-207063, the discarding process of a packet is performed after a packet is read out from the packet buffer. That is, with this packet forwarding apparatus, the reading of valid packets that will not be discarded is restricted because packets that are to be discarded later are read out from the packet buffer unnecessarily. In other words, with this conventional packet forwarding apparatus, data forwarding capacity (band) for reading packets is not being used effectively.

Consequently, an object of the present invention is to provide a method for discarding packets and a packet forwarding apparatus capable of substantially discarding packets that have resided in a packet buffer for a predetermined period of time, without actually reading out these packets from the packet buffer.

A packet forwarding apparatus for solving the above described problem includes a packet buffer for temporarily storing packets to be forwarded, a timer for measuring the time of every predetermined unit period, a plurality of first queues corresponding to each of a plurality of address groups that form the packet buffer, a plurality of second queues provided corresponding to the property of the packets, a first controller for executing the writing of the packets, and a second controller for executing the discarding of the packets.

Each of the plurality of the first queues is a queue for managing the order of writing packets to the addresses in the corresponding address group. Each of the plurality of the second queues manages the order of reading packets from the addresses, out of the addresses of the packet buffer, that have been written. The first controller associates each address group with a write period by switching an address group to be written in every unit period, writes packets to the address group to be written according to the order of the addresses indicated by the first queue corresponding to that address group, and adds the addresses that have been written to the second queue corresponding to the property of the packets. The second controller calculates a residence period of the packet of the first address indicated by the second queue in the packet buffer based on a first write period specified from the address group to which the first address belongs and the present time indicated by the timer, and removes all the addresses that have been written in the first write period from the second queue when packets are determined to be discarded based on the residence period.

A method for discarding packets for solving the above described problem is a method for a packet forwarding apparatus that includes a packet buffer for temporarily storing packets to be forwarded, and a timer for measuring the time of every predetermined unit period. The method for discarding packets includes: providing a plurality of first queues that correspond to each of a plurality of address groups that form the packet buffer, each first queue managing the order of writing packets to the addresses in the corresponding address group; providing a plurality of second queues corresponding to the property of the packets; switching an address group to be written in every unit period, and writing packets to the address group to be written according to the order of the addresses indicated by the first queue corresponding to that address group; adding the addresses to which packets are written to the second queue corresponding to the property of the packets; calculating a residence period of the packet of the first address indicated by the second queue in the packet buffer based on a first write period specified from the address group to which the first address belongs and the present time indicated by the timer; and removing all addresses written in the first write period from the second queue when the packets are determined to be discarded based on the residence period.

According to the above described packet forwarding apparatus and the method for discarding packets, in the case that packets are determined to be discarded based on the residence period of the first address indicated by the second queue, all the addresses written in the same write period (the first write period) as that first address will be removed from the second queue. And, the addresses removed from the second queue become overwritable.

Another packet forwarding apparatus for solving the above described problem includes a packet buffer for temporarily storing packets to be forwarded, a timer for measuring the time of every predetermined unit period, a third queue, a plurality of fourth queues provided corresponding to the property of the packets, a third controller for executing the writing of the packets, and a fourth controller for executing the discarding of the packets.

The third queue is a queue for managing the order of writing packets to the addresses of the packet buffer. Each of the plurality of fourth queues is a queue for managing the order for reading packets from the addresses, out of the addresses of the packet buffer, that have been written, along with the write period for each address in the queue. The third controller writes packets according to the order of the addresses indicated by the third queue, and adds the addresses written along with the time written to the fourth queue corresponding to the property of the packets. The fourth controller calculates the residence period of the packet of the first address indicated by the fourth queue in the packet buffer based on a first write period for that first address and the present time indicated by the timer, and removes all of the addresses written in the first write period from the fourth queue when the packets are determined to be discarded based on the residence period.

Another method for discarding packets for solving the above described problem is a method for a packet forwarding apparatus that includes a packet buffer for temporarily storing packets to be forwarded, and a timer for measuring the time of every predetermined unit period. The method for discarding packets includes: providing a third queue for managing the order of writing packets to the addresses of the packet buffer; providing a plurality of fourth queues corresponding to the property of the packets; writing packets according to the order of the addresses indicated by the third queue; adding addresses in which packets are written along with the write periods to the fourth queue corresponding to the property of the packets; calculating the residence period of the packet of the first address indicated by the fourth queue in the packet buffer based on a first write period for the first address and the present time indicated by the timer; and removing all addresses written in the first write period from the fourth queue when packets are determined to be discarded based on the residence period.

According to the above described packet forwarding apparatus and the method for discarding packets, in the case that packets are determined to be discarded based on the residence period of the first address indicated by the fourth queue in the queue, all of the addresses written in the same write period (the first write period) as that first address are removed from the fourth queue. And, the addresses removed from the fourth queue become overwritable.

The object and advantages of the invention will be realized and attained by means of the elements and combinations particularly pointed out in the claims.

It is to be understood that both the foregoing general description and the following detailed description are exemplary and are not restrictive of the invention, as claimed.

BRIEF DESCRIPTION OF DRAWINGS

Referring now to the attached drawings which form a part of this original disclosure:

FIG. 5 is a diagram showing the contents of the data recorded in a write management table;

FIG. 6 is a diagram showing the contents of the data stored in a delay threshold memory table;

DESCRIPTION OF EMBODIMENT(S)

First Embodiment

An Embodiment of the present invention of a packet forwarding apparatus will be described below with reference to the drawings. A packet forwarding apparatus 1 according to this embodiment is provided on a transmission path of a network, like a router, a switch, and the like, for example, and is an apparatus for forwarding packets from a node to another node on the network.

[Configuration of Packet Forwarding Apparatus 1]

Figure 1:
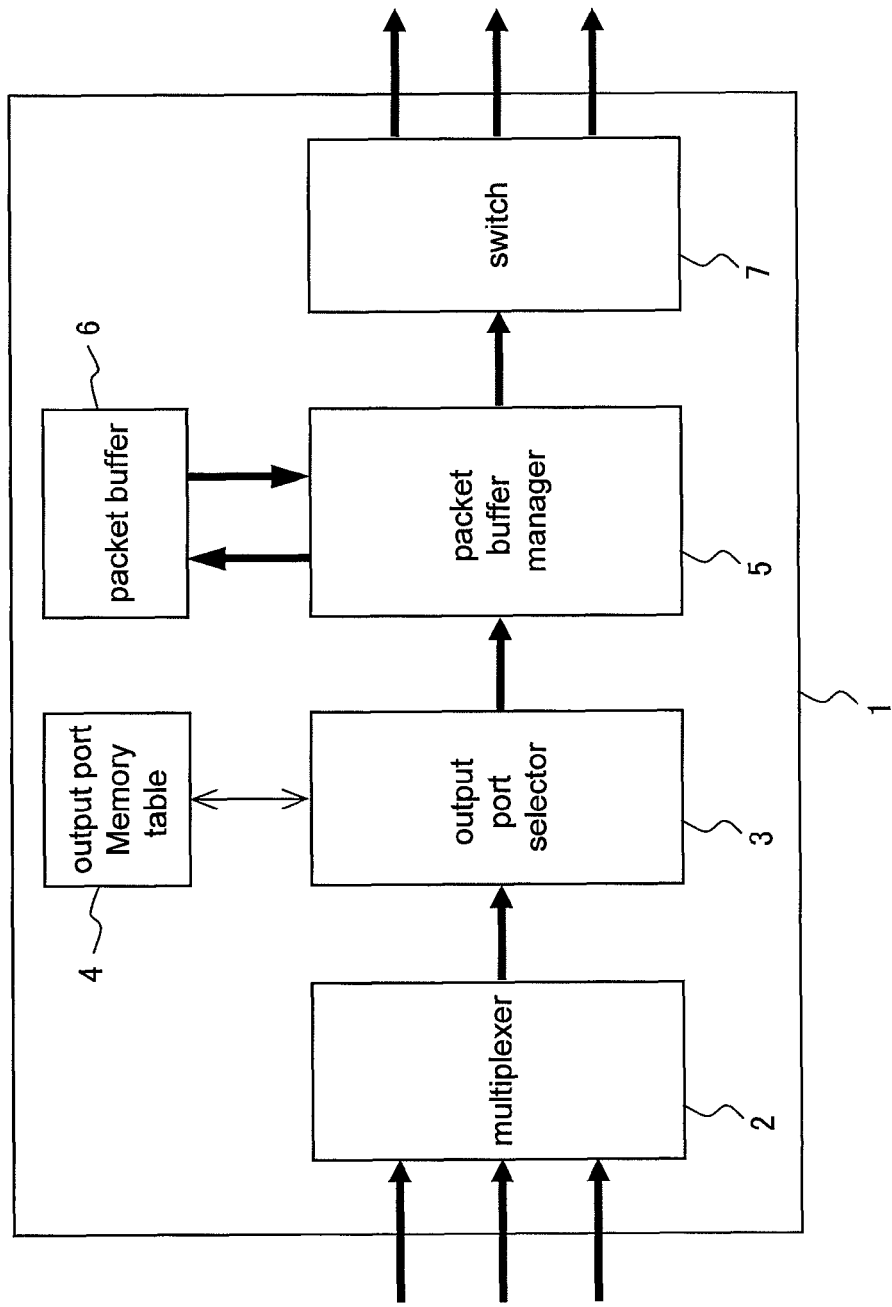
FIG. 1 is a block diagram showing the schematic configuration of a packet forwarding apparatus in accordance with a first embodiment.

First, the configuration of the packet forwarding apparatus 1 according to the present embodiment will be described with reference to FIG. 1. FIG. 1 is a block diagram showing the general configuration of the packet forwarding apparatus 1 according to this embodiment. As illustrated in FIG. 1, this packet forwarding apparatus 1 includes a multiplexer 2, an output port selector 3, an output port memory table 4, a packet buffer manager 5, a packet buffer 6, and a switch 7.

Note that the input-output ports are not specified in FIG. 1, and only the data flow of packets (overall, represented in thick lines from the left side to the right on the page of FIG. 1) is illustrated. Furthermore, in FIG. 1, a case that packets are outputted from the output port provided in the packet forwarding apparatus 1 is represented. However, the same configuration can be taken also with the case of a different output, for example, a communication card mounted on the packet forwarding apparatus 1, or an output port provided inside the card.

In this packet forwarding apparatus 1, the multiplexer 2 multiplexes packets inputted through a plurality of ports (not illustrated in the figure) from the network. The output port selector 3 refers to the output port memory table 4, selects the output port corresponding to the destination address included in each packet, and records information of the selected output port in each packet.

The packet buffer manager 5 imports packets sent from the output port selector 3, and holds the packets in the packet buffer 6 by writing (storing) the packets in the packet buffer 6.

Furthermore, the packet buffer manager 5 reads the packets in the packet buffer 6 periodically, or in response to a read request from a controller, not illustrated in the figure, and sends out the packets to the switch 7. At this time, the packet buffer manager 5 discards packets that have resided for a certain period of time in the packet buffer 6. The writing, reading, and discarding processes of packets with respect to the packet buffer 6 will be described in detail later.

At the switch 7, switching is performed based on the information of the output port recorded in the packet sent out from the packet buffer manager 5, and the packet is outputted from the output port.

[Packet Buffer Manager 5]

The packet buffer manager 5 of this packet forwarding apparatus 1 will be described in detail below.

At the packet buffer manager 5, the writing order of packets to writable addresses of the packet buffer 6 is managed. In other words, the packet buffer manager 5 manages the free addresses of the packet buffer 6 and the order of the free addresses when writing packets that arrived. In addition, at the packet buffer manager 5, the reading order of packets from the addresses that have been written is being managed. That is, the packet buffer manager 5 manages the addresses that have been written of the packet buffer 6, and the order of the addresses that have been written when reading the packets.

The above described writing order of packets and reading order of packets are managed by queues (free-pointer queues and packet queues to be described later) through pointers in this embodiment.

Figure 2:
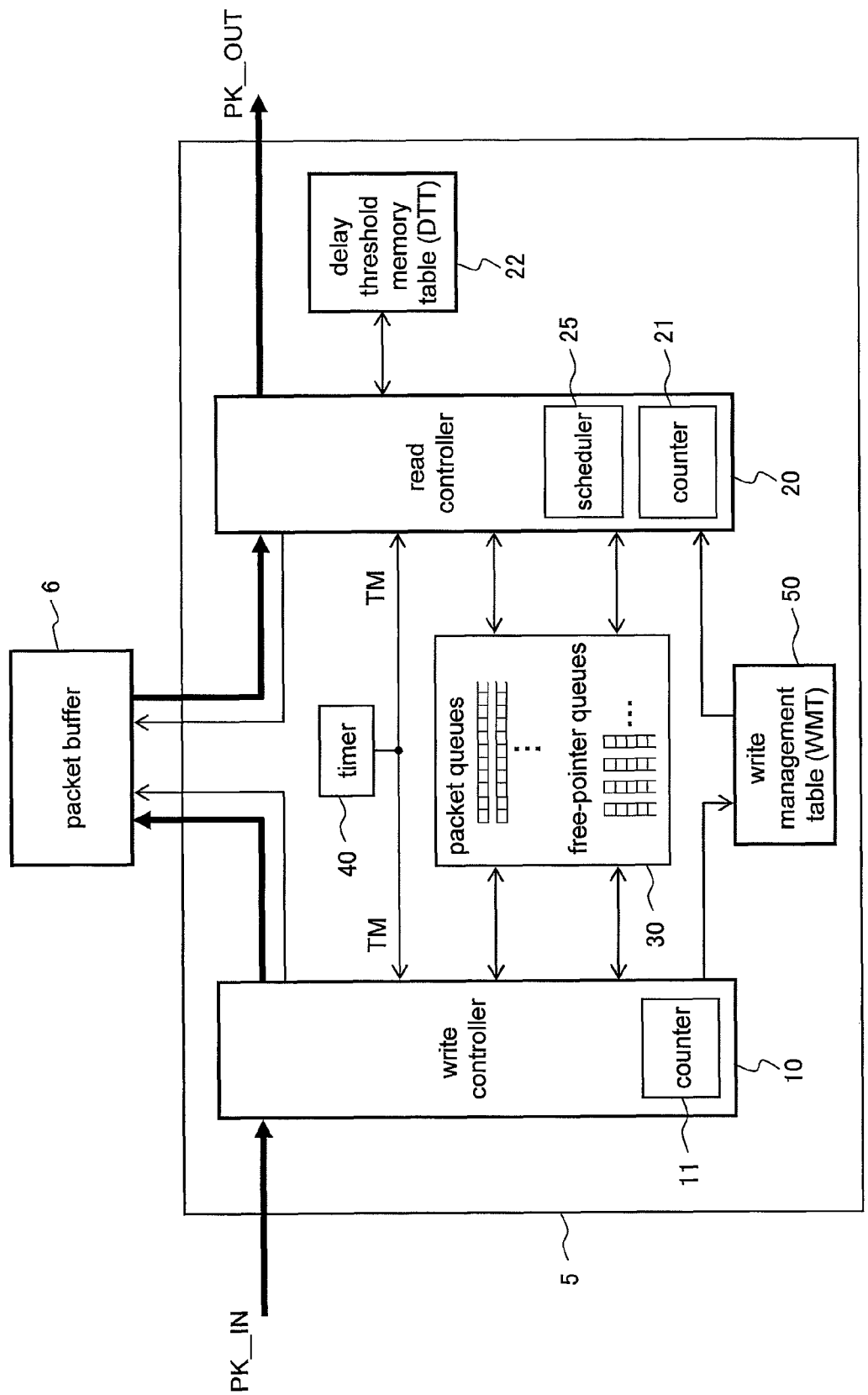
FIG. 2 is a block diagram showing the configuration of a packet buffer manager in relation to a packet buffer.

The configuration of the packet buffer manager 5 of the packet forwarding apparatus 1 according to this embodiment will be described with reference to FIG. 2. FIG. 2 is a block diagram showing the configuration of the packet buffer manager 5 in relation to the packet buffer 6.

As illustrated in FIG. 2, the packet buffer manager 5 includes a write controller 10 (first controller), a read controller 20 (second controller), a pointer storage 30, a delay threshold memory table 22 (DTT), a timer 40, and a write management table 50 (WMT). Furthermore, in FIG. 2, the data flow (the flow from input packet PK_IN to output packet PK_OUT) of a packet is illustrated in heavy lines in the packet buffer manager 5. In this embodiment, the case is described as an example where the maximum delay period allowed for packets, in other words, the longest period for which a packet is able to reside in the packet buffer 6 is 128 ms.

[Timer 40]

The timer 40 in FIG. 2 measures the time of every predetermined unit period.

The time measured by the timer 40 becomes the unit for the timing of the write process and read process of the packets, and also is used for calculation of the residence period of packets in the packet buffer 6. The predetermined unit period for the measurement of the timer 40 (hereinafter, arbitrarily expressed as "unit period") is set to be short enough so that the judgment for discarding a packet with a shortest allowable delay period, for example, a packet for reproducing in real-time an audio or an image can be performed properly. In this embodiment, the unit period in the measurement of the timer 40 is described to be 1 ms, as an example.

[Pointer Storage 30 (Free-Pointer Queues and Packet Queues)]

Free-pointer queues and packet queues are stored in the pointer storage 30 as queues (waiting lines formed by a link list through pointers) by pointers having pointer addresses corresponding to each address of the packet buffer 6. Each queue in the pointer storage 30 is formed by a memory independent of the packet buffer 6.

Here, the free-pointer queues are queues for managing the order of writing packets to the writable addresses of the packet buffer 6. The packet queues are queues for managing the order of reading packets from the addresses that have been written.

The free-pointer queues will be described first.

Figure 3:
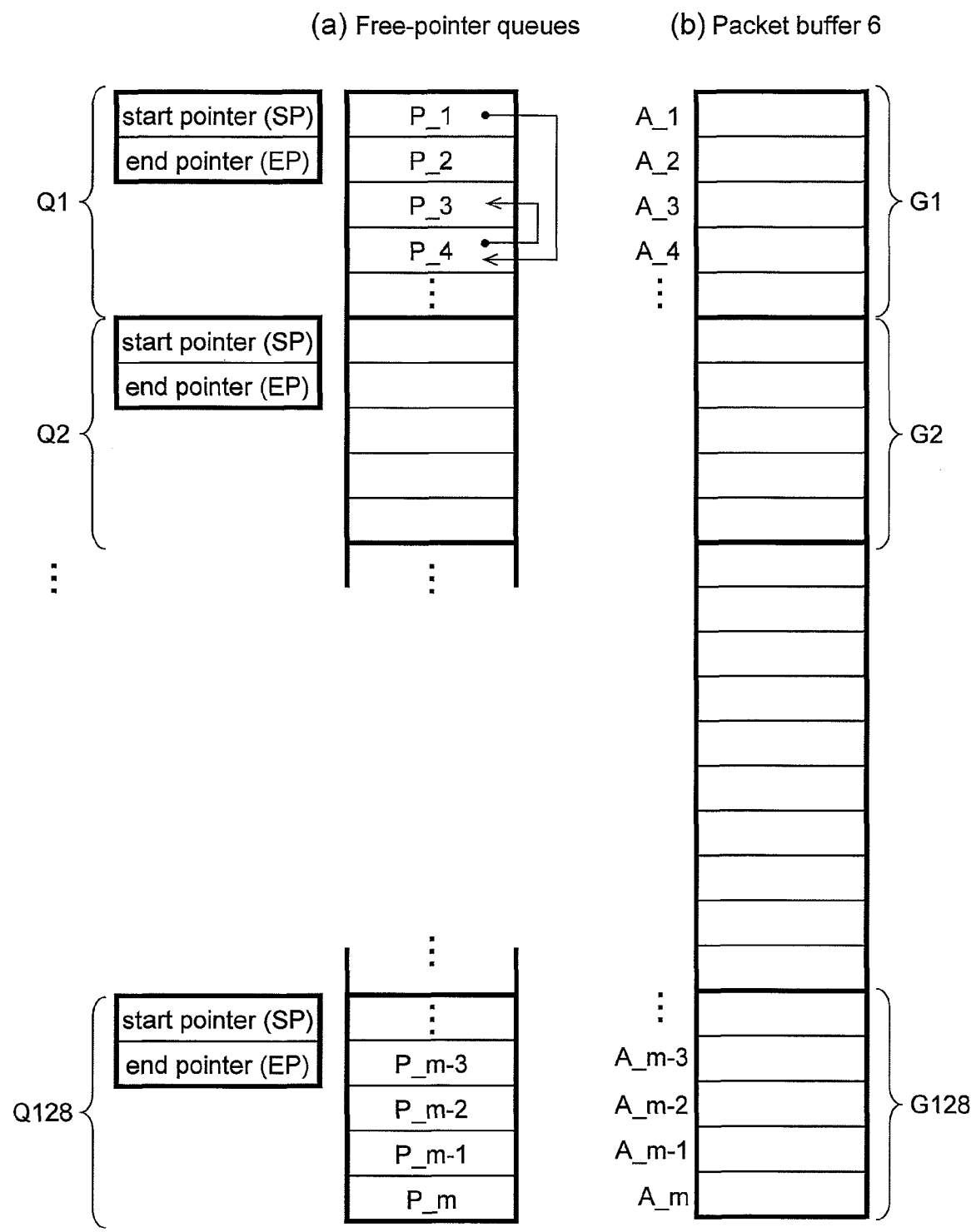
FIG. 3 is a diagram for describing the configuration of a free-pointer queue in relation to the packet buffer.

FIG. 3 is a diagram for describing the configuration of the free-pointer queues in relation to the packet buffer 6, and (a) shows the configuration of the free-pointer queues and (b) shows the configuration of the packet buffer 6.

In the pointer storage 30, pointers having pointer addresses corresponding to each of the addresses of the packet buffer 6 are prepared. In other words, as illustrated in FIG. 3, pointers P_1, P_2, P_3, P_4, . . . , P_m-3, P_m-2, P_m-1, P_m are provided for pointer addresses corresponding to the addresses A_1, A_2, A_3, A_4, . . . A_m-3, A_m-2, A_m-1, A_m of the packet buffer 6, respectively.

In the following description, each address of the packet buffer 6 is conveniently referred to as "address corresponding to pointer P_x (x: 1~m)".

In addition, in this embodiment, as illustrated in FIG. 3, 128 free-pointer queues Q1, Q2, . . . , Q128 (a plurality of first queues) formed from a plurality of pointer groups in the order of the pointer addresses are provided. By doing so, each free-pointer queue is provided to correspond to each of the plurality of the address groups that imaginarily divide up the region of the packet buffer 6.

For example, the free-pointer queue Q1 including pointers P_1, P_2, P_3, P_4 is provided to correspond to the address group G1 of the packet buffer 6 to which the addresses A_1, A_2, A_3, A_4 belong, and free-pointer queue Q128 including pointers P_m-3, P_m-2, P_m-1, P_m is provided to correspond to the address group G128 of the packet buffer 6 to which the addresses A_m-3, A_m-2, A_m-1, A_m belong.

In each of the free-pointer queues Q1 to Q128, a queue is formed by a link list of pointers. That is, in each free-pointer queue, a link list of pointers is formed entirely through a pointer pointing to a pointer address of the next pointer. In addition, a start pointer (hereinafter, arbitrarily abbreviated as "SP") and an end pointer (hereinafter, arbitrarily abbreviated as "EP") are provided for managing each of the start and end of a link list of each of the free-pointer queues as data included in each of the free-pointer queues.

For example, in the free-pointer queue Q1 in FIG. 3, an example is represented of a link list of P_1 (start pointer)→P_4→P_3 (end pointer) formed overall, by pointer P_1 pointing to pointer P_4 and pointer P_4 pointing to pointer P_3. In this case, it means that pointer P_1 points to the fourth pointer address, and pointer P_4 points to the third pointer address. This example of the free-pointer queue Q1 indicates that the addresses A_1, A_3, A_4 of the packet buffer 6 are free addresses, and the order of the free addresses when writing the packets is A_1→A_4→A_3.

The packet queues will be described next.

As it will be described later, in the packet buffer manager 5, every time a packet is to be written to the packet buffer 6, a pointer of a free-pointer queue is disconnected from the link list of the free-pointer queue according to the indicated order. A packet queue is then formed by the disconnected pointers forming in order a link list. In other words, in a packet queue, pointers having pointer addresses corresponding to addresses of packets that have been written are in a order. Through this packet queue, the order of reading the packets from the addresses that have been written is being managed.

Figure 4:
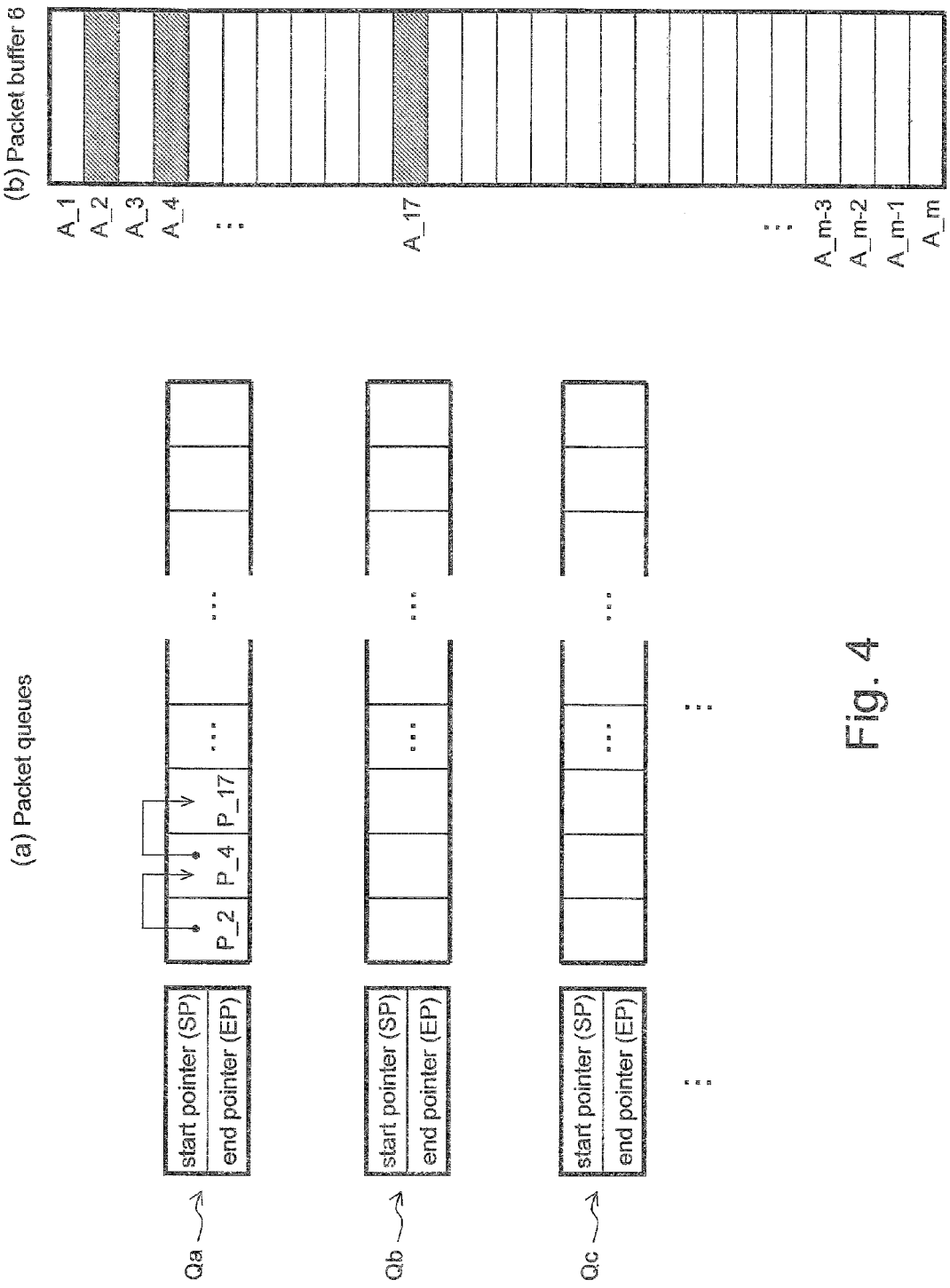
FIG. 4 is a diagram for describing the configuration of a packet queue in relation to the packet buffer.

FIG. 4 is a diagram for describing the configuration of the packet queues in relation to the packet buffer 6, and (a) shows the configuration of the packet queues and (b) shows the configuration of the packet buffer 6. As illustrated in FIG. 4, the pointer storage 30 includes a plurality of packet queues Qa, Qb, Qc, . . . (a plurality of second queues). Each of the plurality of packet queues is provided in association with the property of the packets that are each to be forwarded. Here, the property of a packet, for example, is being associated with the class based on VLAN (Virtual LAN) control information defined in the packet.

In each of the packet queues Qa, Qb, Qc, . . . , a queue is formed by a link list of pointers. That is, in each packet queue, a link list of pointers is formed overall by a pointer pointing to the pointer address of the next pointer. Furthermore, a start pointer (SP) and an end pointer (EP) are provided for managing each of the start and end of a link list of each packet queue as data included in each packet queue.

For example, in the packet queue Qa in FIG. 4, an example is illustrated of a link list of P_2 (start pointer)→P_4→P17 (end pointer) formed overall, by the pointer P_2 pointing to pointer P_4 and pointer P_4 pointing to pointer P_17. In this case, it means that the pointer P_2 points to the fourth pointer address and the pointer P_4 points to the seventeenth pointer address. This example of the packet queue Qa indicates that the addresses of the packet buffer 6 that have been written are addresses A_2, A_4, A_17, and the order of the addresses that have been written when reading the packets is A_2→A_4→A_17.

The packet buffer manager 5 updates the link list of a packet queue every time a packet is written to the packet buffer, by borrowing a start pointer from a free-pointer queue. In the description of this embodiment, "borrowing" a pointer means a pointer is disconnected from a link list of a free-pointer queue, and this pointer is connected to a link list of a packet queue.

In addition, the packet buffer manager 5 updates the link list of a packet queue every time a packet is read from the packet buffer, by returning the pointer corresponding to the address of the packet that is read to the free-pointer queue. In the description of this embodiment, "returning" a pointer means the pointer that has been borrowed once from the free-pointer queue is disconnected from the link list of the packet queue, and this pointer is connected again to the link list of the free-pointer queue.

In this embodiment, in order to make it easy to understand, a case of a single packet written to, or read from each address of the packet buffer 6 is described. However, it is also possible for one packet to be written to a plurality of addresses of the packet buffer 6. In that case, the plurality of pointers corresponding to the plurality of addresses are borrowed, or returned, while the link between the plurality of pointers is being kept.

In addition, in the case that a single packet is written to each address of the packet buffer 6, the number of pointers included in each free-pointer queue (in other words, the number of addresses included in an address group in the packet buffer) is set to be the same number or more than the number of packets that can be written in a unit period (1 ms in this embodiment) in the measurement of the timer 40.

[Write Controller 10]

Referring to FIG. 2 again, the write controller 10 (first controller) will be described.

The write controller 10 determines the property of a packet PK_IN imported from the output port selector 3, and associates this packet with one of the packet queues in the plurality of packet queues included in the pointer storage 30.

The write controller 10 receives time data TM of every unit period (1 ms in this embodiment) from the timer 40. In the write controller 10, a write control is performed with this unit period as the write period. More specifically, the write controller 10 writes packets to the addresses in the same address group, if the time data TM from the timer 40 does not change, in other words, within a write period, and switches, in order, to another address group of the packet buffer 6 to which packets are written, every time the write period changes (renews). Referring to FIG. 3, packets are written to address group G1 in a write period, and packets are written to address group G2 in the subsequent write period.

In this manner, in the write controller 10, packets are being written while the address group of the packet buffer 6 to which packets are to be written and the write period of packets are associated with each other. In this embodiment, the association between the address group of the packet buffer 6 and the write period is done using the free-pointer queue corresponding to each address group.

More specifically, the write controller 10 writes packets in a write period while referring to the link list of the free-pointer queue corresponding to this write period. In other words, the writing within a write period is performed by borrowing the start pointer from the corresponding free-pointer queue, and specifying the address corresponding to this pointer to access the packet buffer 6. The borrowed pointer is connected to the link list of the packet queue corresponding to the property of the packet to be written. Therefore, in the packet buffer manager 5, by referring to the pointer address of the pointer borrowed from the free-pointer queue, it is possible to later recognize the write period of the packet written to the address corresponding to this pointer.

The write controller 10 includes a counter 11 (first counter) for counting the number of packets written to the packet buffer 6 within the same write period. This counter 11 is reset every time time data TM is received from the timer 40.

At the write controller 10, the write management table 50 (WMT) is accessed in each write period, and packet write data is recorded in each write period. This packet write data will be described referring to FIG. 5. FIG. 5 is a diagram showing the contents of data recorded in the write management table 50.

As illustrated in FIG. 5, the packet write data in each write period (WP1, WP2, . . . , WP128) is recorded for each packet queue (Qa, Qb, Qc, . . . ). The packet write data includes a front pointer of the subject write period (present period), a last pointer of the previous write period (previous period), and the number of packets written in the previous period.

Here, the front pointer of the present period (hereinafter, arbitrarily abbreviated as "FP") is the pointer that is borrowed from the free-pointer queue and added to the packet queue when writing the first packet in the subject write period. The last pointer of the previous period (hereinafter, arbitrarily abbreviated as "LP") is the pointer that is borrowed from the free-pointer queue and added to the packet queue when writing the last packet in the previous write period. This last pointer (LP) is temporarily stored in a temporary register arranged in the write controller 10, and is read out from the temporary register and recorded in the write management table 50 when time data TM is received from the timer 40 (in other words, when moved to the next write period).

For example, assume that packets corresponding to packet queue Qa in the write period WP1 are written to the addresses A_2, A_4 of the packet buffer 6, and the writing of packets corresponding to packet queue Qa in write period WP2 starts from address A_17. In this case, as exemplified in FIG. 5, it is recorded in the write management table 50 that in the packet queue Qa of write period WP2, the front pointer is P_17, last pointer is P_4, and the number of packets written is 2.

[Read Controller 20]

Next, the read controller 20 (second controller) will be described referring to FIG. 2 again.

The read controller 20 receives time data TM of every unit period (1 ms in this embodiment) of the timer 40. At the read controller 20, the unit period of the timer 40 is managed as the read period. The read process at the read controller 20 is performed if there is a read request of a packet queue from a scheduler 25 for managing the band and the like of every packet queue, or when the time data TM from the timer changes (when the read period changes (renews)).

In this read process, the discarding of packets that have resided for a certain period in the packet buffer 6 is also performed. When the read period changes, the read process is performed for the purpose of discarding packets that resided in the packet buffer 6 for a certain period, and packets are not actually read or sent.

As it is already described, since it is possible to recognize the write period of packets written to addresses corresponding to each pointer, through the values of the pointer addresses of each pointer that forms the packet queue, the read controller 20 judges the discarding of a packet in the following way. That is, the read controller 20 first calculates a residence period of a packet of the address corresponding to the pointer, based on the difference between the write period corresponding to the start pointer of each packet queue and the present time data (present time) received from the timer 40. Next, the read controller 20 compares the calculated residence period with the delay threshold stored in the delay threshold memory table 22 (DTT), and if the residence period exceeds the delay threshold, this packet is judged to be discarded.

FIG. 6 is a diagram showing the contents of data stored in the delay threshold memory table 22. As illustrated in FIG. 6, the delay threshold memory table 22 includes data that shows the delay threshold (ms) of every packet queue (Qa, Qb, Qc, ...). Based on the property of the packets corresponding to the packet queues, in the case that the priority is high in the order of Qa, Qb, Qc, the delay threshold corresponding to each packet queue is set so that D1<D2<D3 is satisfied. For example, a small delay threshold is set in advance for a packet including highly real-time data, since the priority is considered to be high based on the property thereof.

The read controller 20 accesses the address of the packet buffer 6 corresponding to the start pointer of a packet queue to read the packet and returns the pointer to the free-pointer queue, in the case that it is judged that the packet should not be discarded (in other words, in the case that it is judged that the packet should actually be read).

On the contrary, if a packet is judged to be discarded, the read controller 20 does not access the packet buffer 6, and returns all of the pointers borrowed within the same write period as the start pointer of the packet queue to the free-pointer queue. At this time, the write management table 50 is referred by the read controller 20. Pointers returned to the free-pointer queue can be borrowed by the write controller 10 at a later write period, and therefore, it is possible to overwrite new packets on the addresses corresponding to those pointers.

The read controller 20 includes a counter 21 (second counter) for counting the number of packets read from the packet buffer 6, out of packets that are written within the same write period. This counter 21 is reset every time the pointer corresponding to the address of the first packet written in each write period is read from the packet queue.

The read controller 20 calculates the number of packets that are discarded (discarded packet number) by subtracting the count value of this counter 21 (which is the number of packets read) from the number of packets written that is recorded in the write management table 50, for each read period. Therefore, with this packet forwarding apparatus 1, the discarded packet number can be obtained without reading the packets that are to be discarded from the packet buffer.

[Operation of the Packet Buffer Manager]

Next, the operation of the packet buffer manager in the packet forwarding apparatus 1 of this embodiment will be described.

[Packet Write Process]

Figure 7:
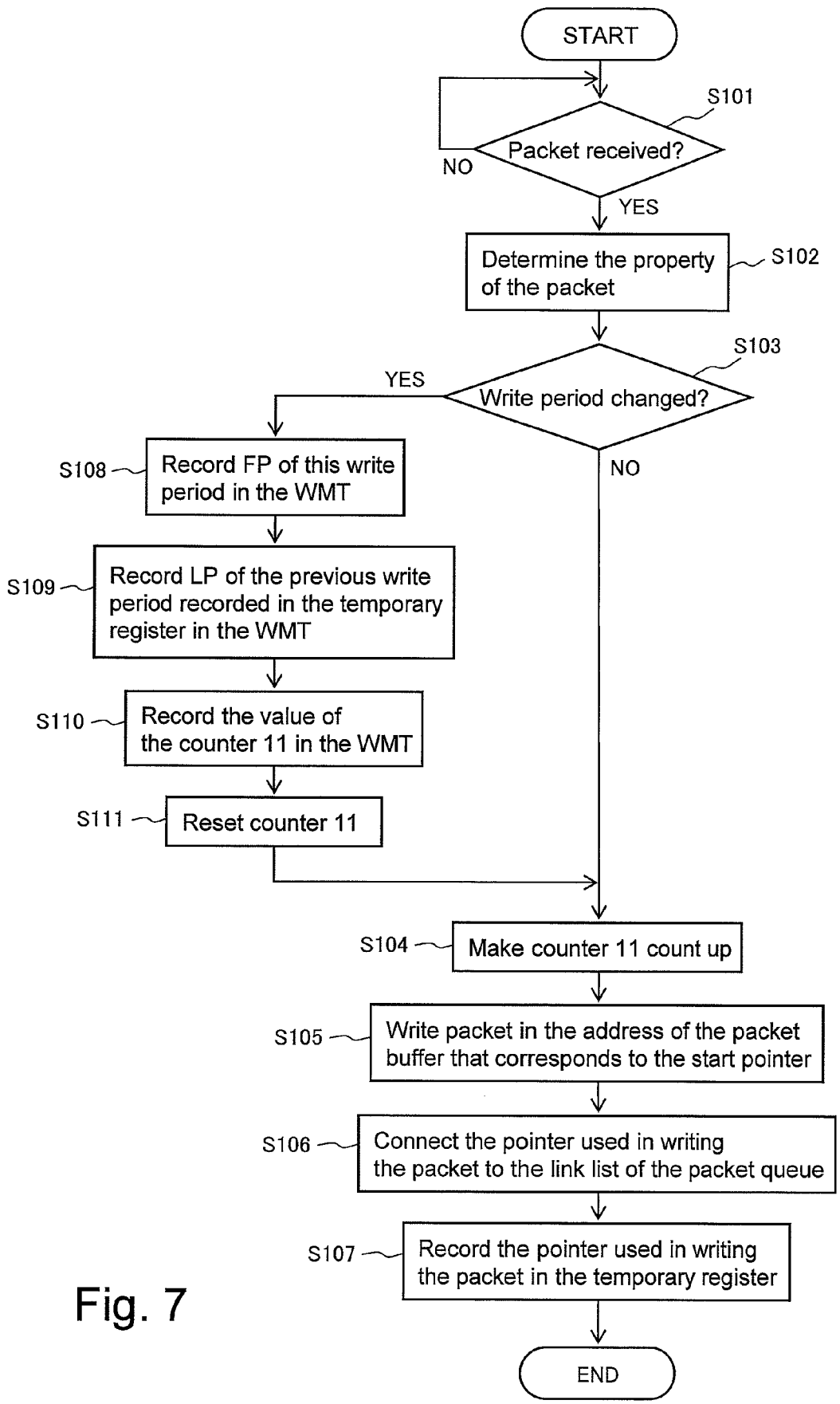
FIG. 7 is a flow chart showing the operation of the packet buffer manager in a packet write process.
Figure 8:
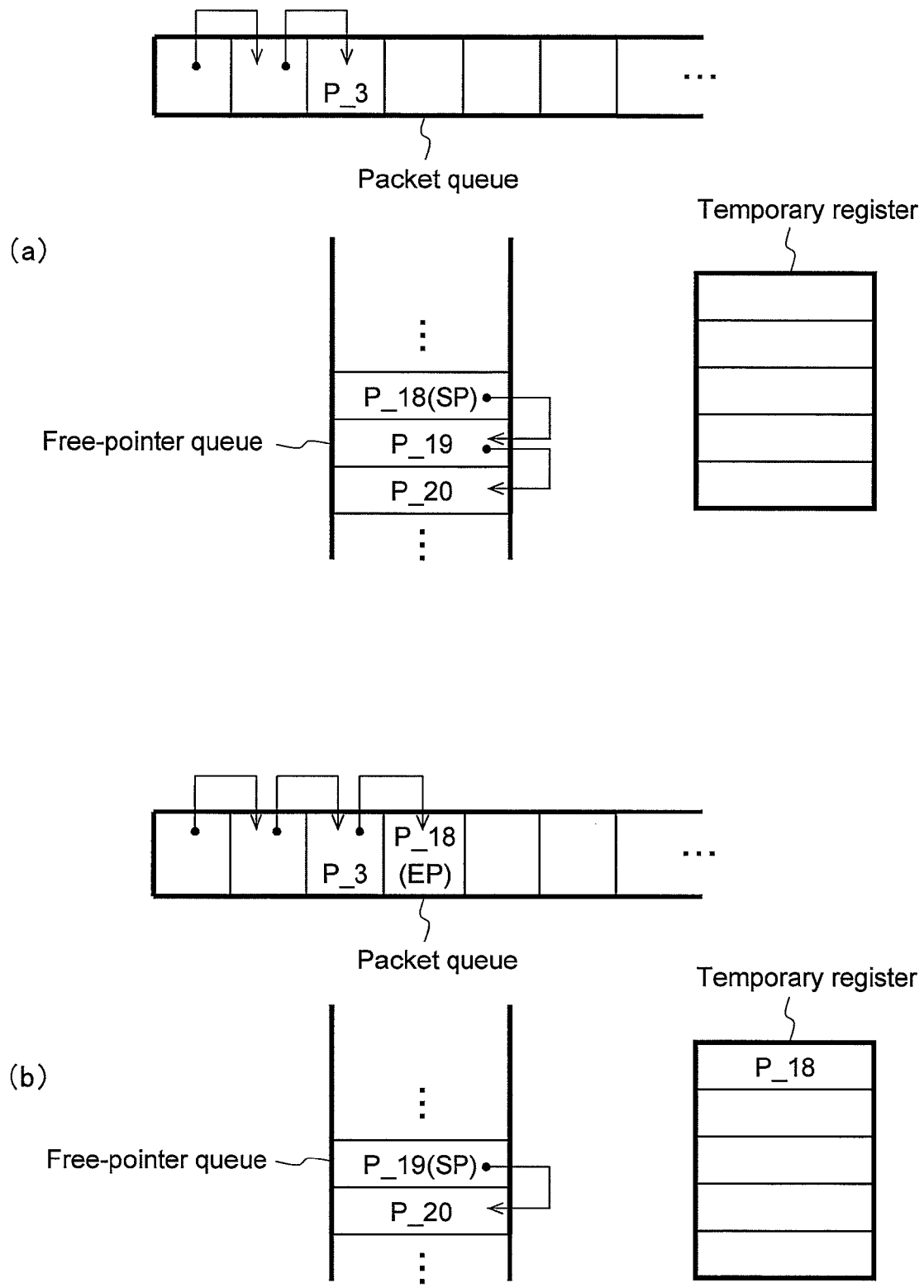
FIG. 8 is a diagram for describing an example of a packet queue and a free-pointer queue before and after writing a packet.
Figure 9:
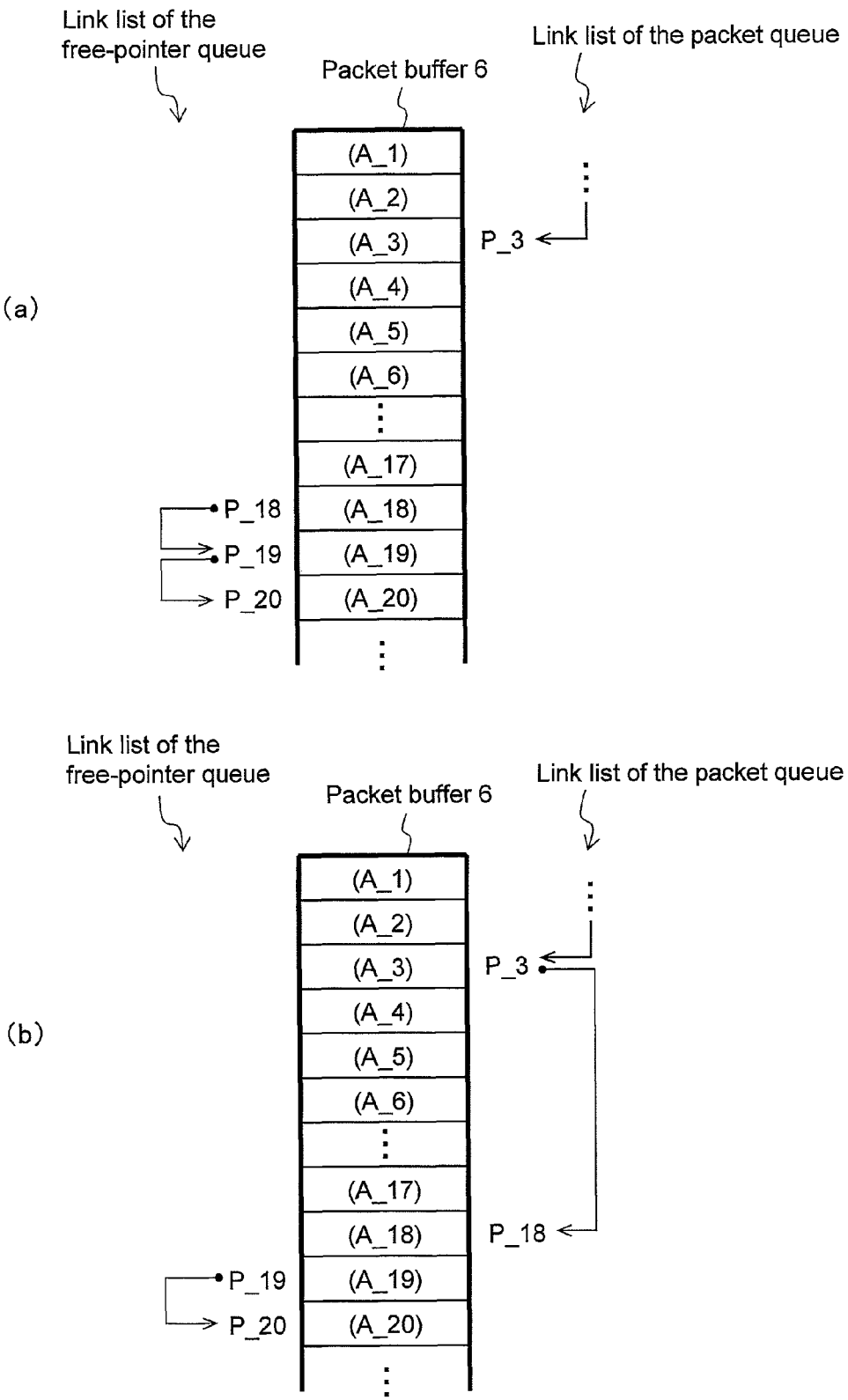
FIG. 9 is a diagram for describing an example of the link list of each queue before and after writing a packet in relation to the packet buffer.

First, the operation of the packet buffer manager 5 in a packet write process will be described with reference to FIGS. 2 and 7 to 9. FIG. 7 is a flow chart showing the operation of the packet buffer manager 5 in a packet write process. FIG. 8 is a diagram showing an example of a packet queue and a free-pointer queue before and after writing a packet. FIG. 9 is a diagram for describing an example of the link list of each queue before and after the writing of a packet, in relation to the packet buffer.

Below, the flow chart of FIG. 7 will be described while referring to FIG. 2.

In FIG. 7, when the write controller 10 receives a packet PK_IN from the output port selector 3 (YES in Step S101), the property of the packet is determined (Step S102), for example, by the class based on the VLAN control information defined in the packet. Through the property determined, the received packet is associated with one of the plurality of packet queues. The write controller 10 then judges whether or not the write period from the time of writing the previous packet has changed (Step S103). This judgment is based on whether or not the time data TM from the timer 40 has changed. If the write period has not changed (NO in Step S103), the write controller 10 makes the counter 11 count up (Step S104).

In addition, the write controller 10 refers to the pointer storage 30, and borrows the start pointer of the free-pointer queue corresponding to the write period at the moment to write the packet to the address of the packet buffer 6 corresponding to the pointer. In other words, the write controller 10 first specifies the address of the packet buffer 6 corresponding to the start pointer of the free-pointer queue to access the packet buffer 6, and writes the packet received in Step S101 (Step S105). Next, the write controller 10 connects the borrowed pointer to the link list of the packet queue that is associated in Step S102 (Step S106). At this time, in the free-pointer queue, the next pointer of the pointer address pointed by the start pointer (borrowed pointer) is set as the new start pointer.

Finally, the write controller 10 records the borrowed pointer in the internal temporary register (Step S107) for a process (Step S109 to be described later) after the write period has changed. If a plurality of packets is written within the same write period, the above Steps S101 through S107 are repeated, and the recording is done by overwriting successively to the temporary register.

If the write period has changed after a packet is received (YES in Step S103), the write controller 10 accesses the write management table 50 (WMT) and records the packet write data (Steps S108 through S110) corresponding to the appropriate write period (new write period).

More specifically, in Step S108, the write controller 10 refers to the pointer storage 30, and records the start pointer of the free-pointer queue corresponding to the new write period as the front pointer (FP) in this write period in the write management table 50 (WMT). This front pointer (FP) is recorded to associate with the packet queue that is associated in Step S102. The write controller 10 then records the value of the pointer recorded in the temporary register as the last pointer (LP) of the previous period (write period before the change) in the write management table 50 (WMT). Furthermore, the write controller 10 records the count value of the counter 11 as the number of packets written (W_num) of the previous period (write period before the change) in the write management table 50 (WMT).

After recording the packet write data, the counter is reset (Step S111), and the process of the new write period is performed (from Step S104 and on).

The operation flow of the packet buffer manager 5 during a packet write process was described above. Additionally, an example of changes in the link lists of a free-pointer queue and a packet queue when writing a packet will be described specifically with reference to FIGS. 8 and 9.

FIG. 8 is a diagram for describing an example of each of the queues and the data of the temporary register, and (a) shows the state before one packet is newly written and (b) shows the state after the packet is written. Here, assume a case that, before writing the packet, the link list by the pointers of the free-pointer queue is P_18 (SP)→P_19→P_20, and the link list by the pointers of the packet queue has P_3 as the end pointer (EP). In this case, when writing the new packet, P_18, which is the start pointer of the free-pointer queue corresponding to the write period at the time, is borrowed. In other words, as illustrated in FIG. 8(b), P_18, which is the start pointer of the free-pointer queue, is connected to the link list of the packet queue, and this P_18 is the new end pointer (EP) of the packet queue. The free-pointer queue then has the pointer P_19 (the next pointer) of the pointer address that P_18, which is the start pointer before writing the packet, pointed to as the new start pointer (SP). In addition, the borrowed pointer (in this case, P_18) is recorded in the temporary register. This example of the series of processes is performed in Steps S105 through S107 in FIG. 7.

FIG. 9 shows the relationship between the link lists of each of the queues and the addresses of the packet buffer corresponding to the link lists, in the same example as FIG. 8, with (a) showing the state before the one packet is newly written, and (b) showing the state after the packet is written. In FIG. 9, the process on the link list of each of the queues in the case that the start pointer P_18 of the free-pointer queue is borrowed is described in a form that is easy to understand visually through the relationship thereof with the packet buffer 6. In this example, the packet is written in the address A_18 of the packet buffer that correspond to the pointer P_18 borrowed from the free-pointer queue.

[Packet Read Process]

Figure 10:
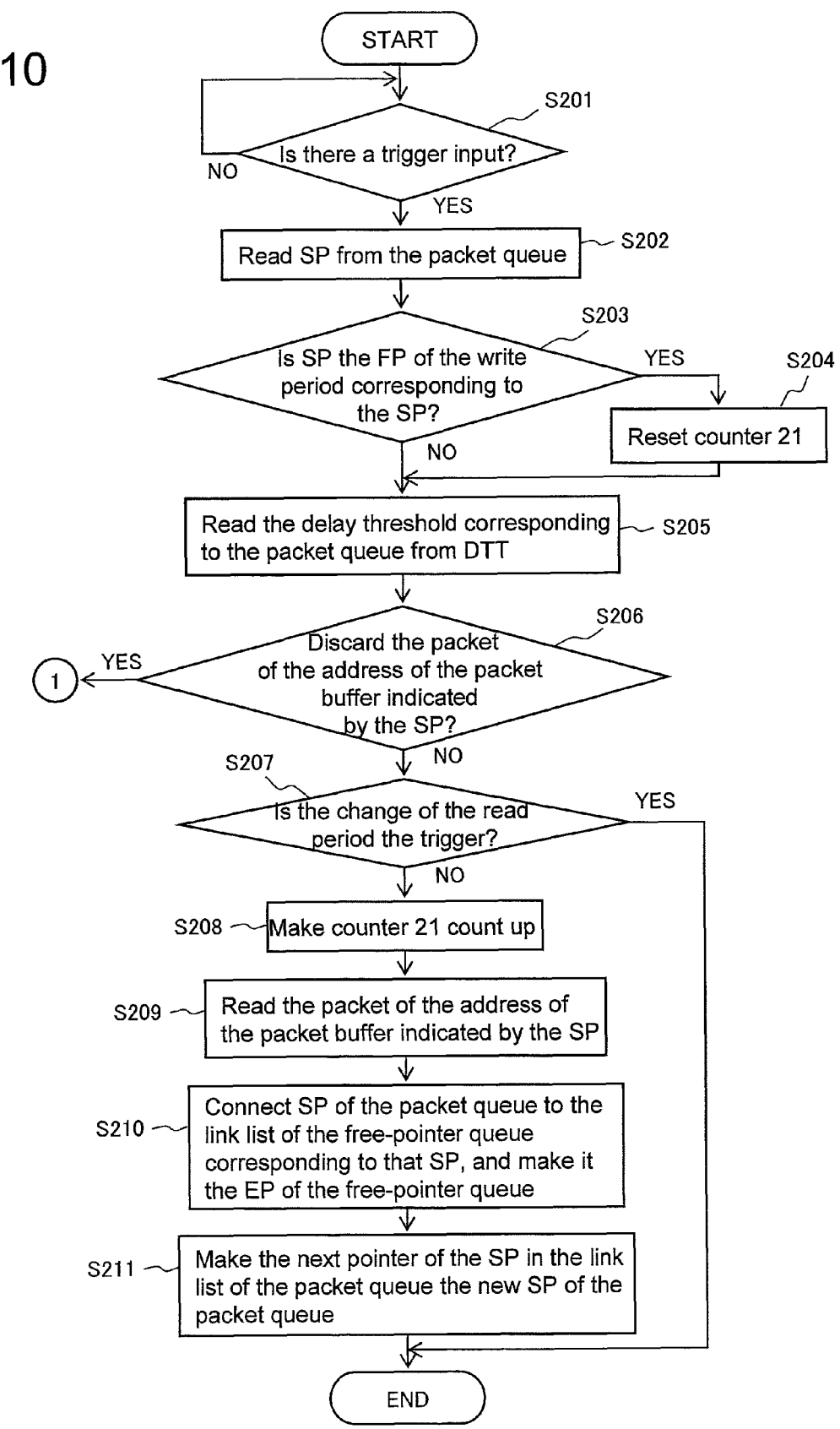
FIG. 10 is a flow chart showing the operation of the packet buffer manager in a packet read process.
Figure 11:
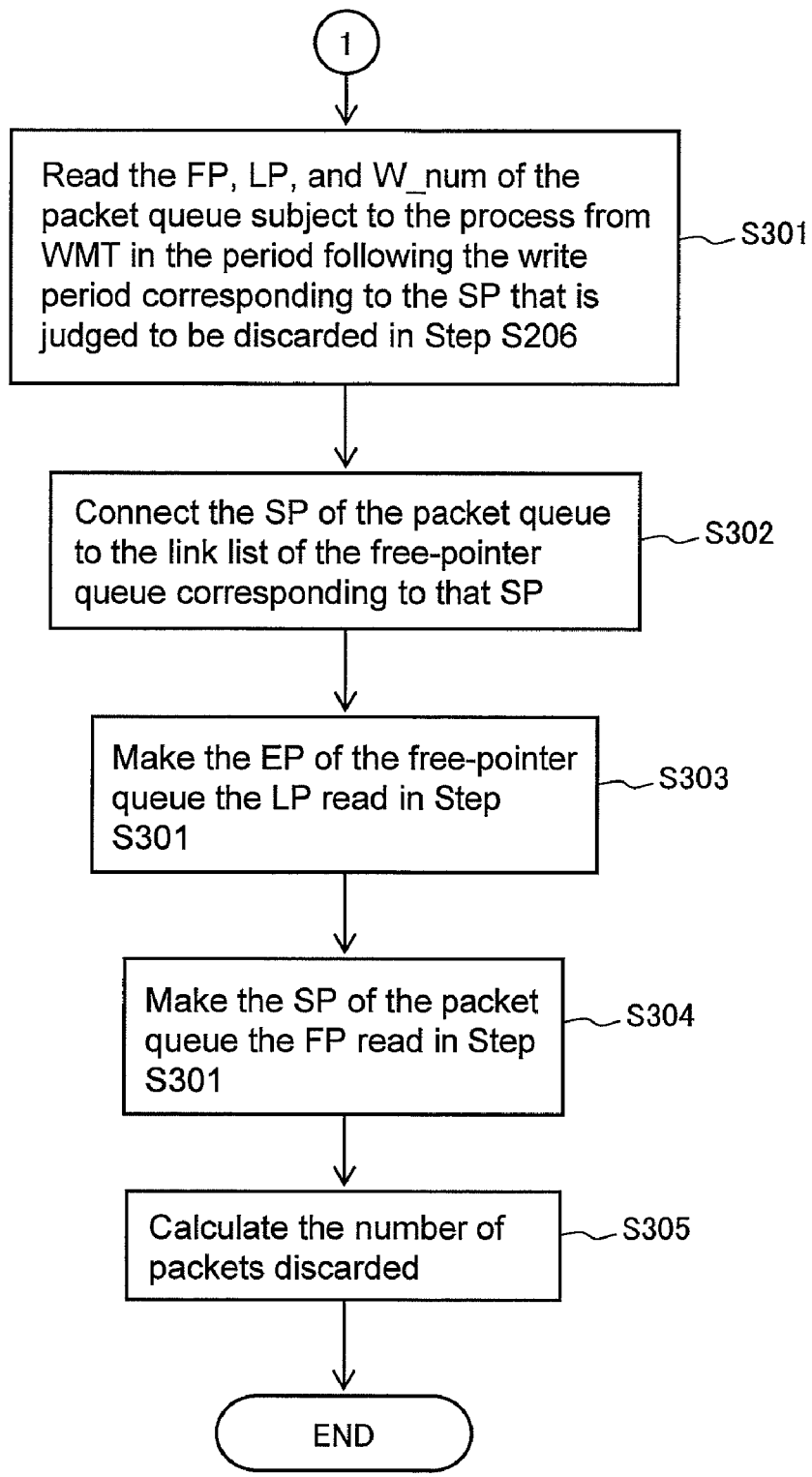
FIG. 11 is a flow chart showing an operation of the packet buffer manager in a packet read process.
Figure 12:
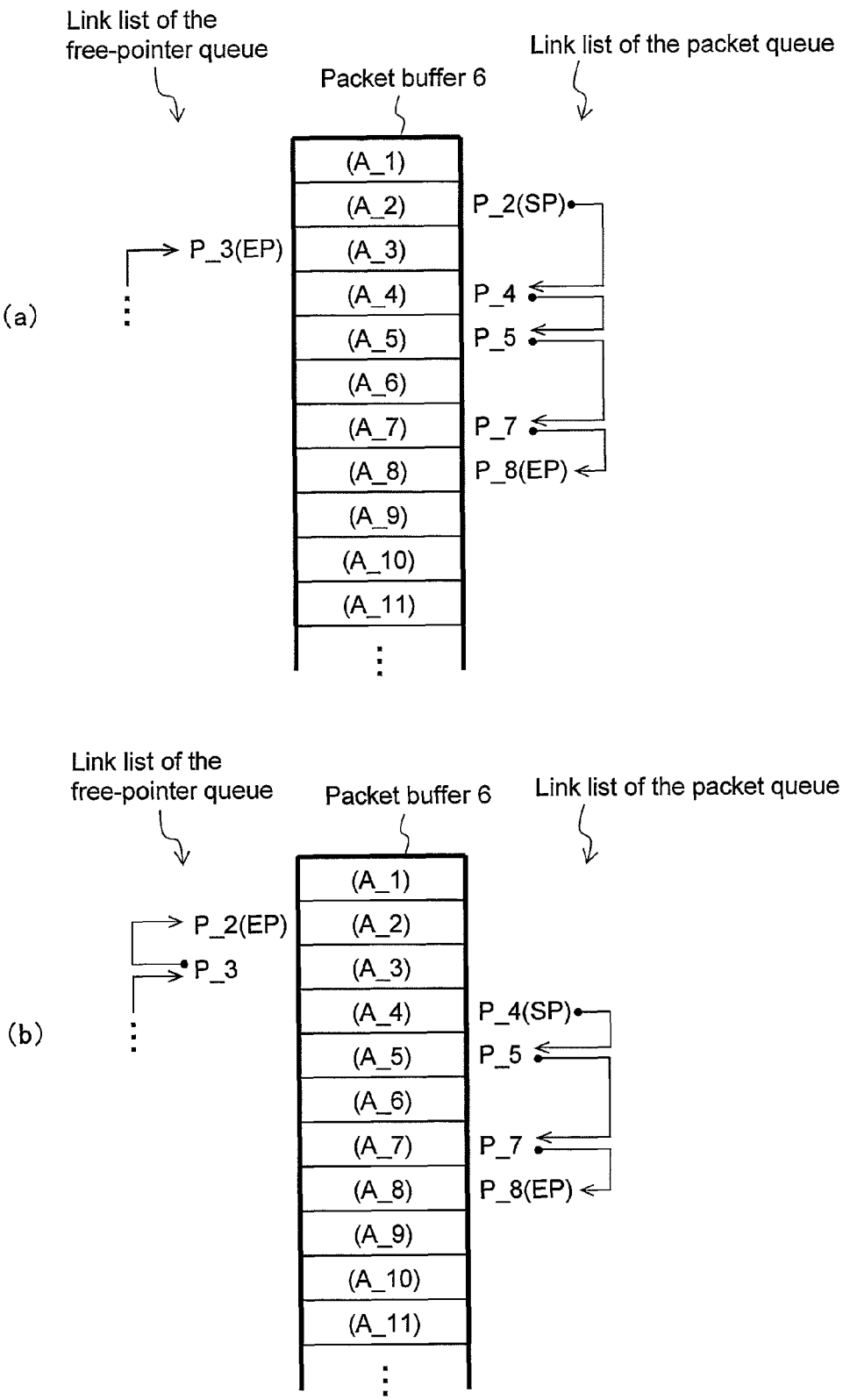
FIG. 12 is a diagram for describing an example of the link list of each queue before and after a packet is read in relation to the packet buffer in the case of actually reading a packet.
Figure 13:
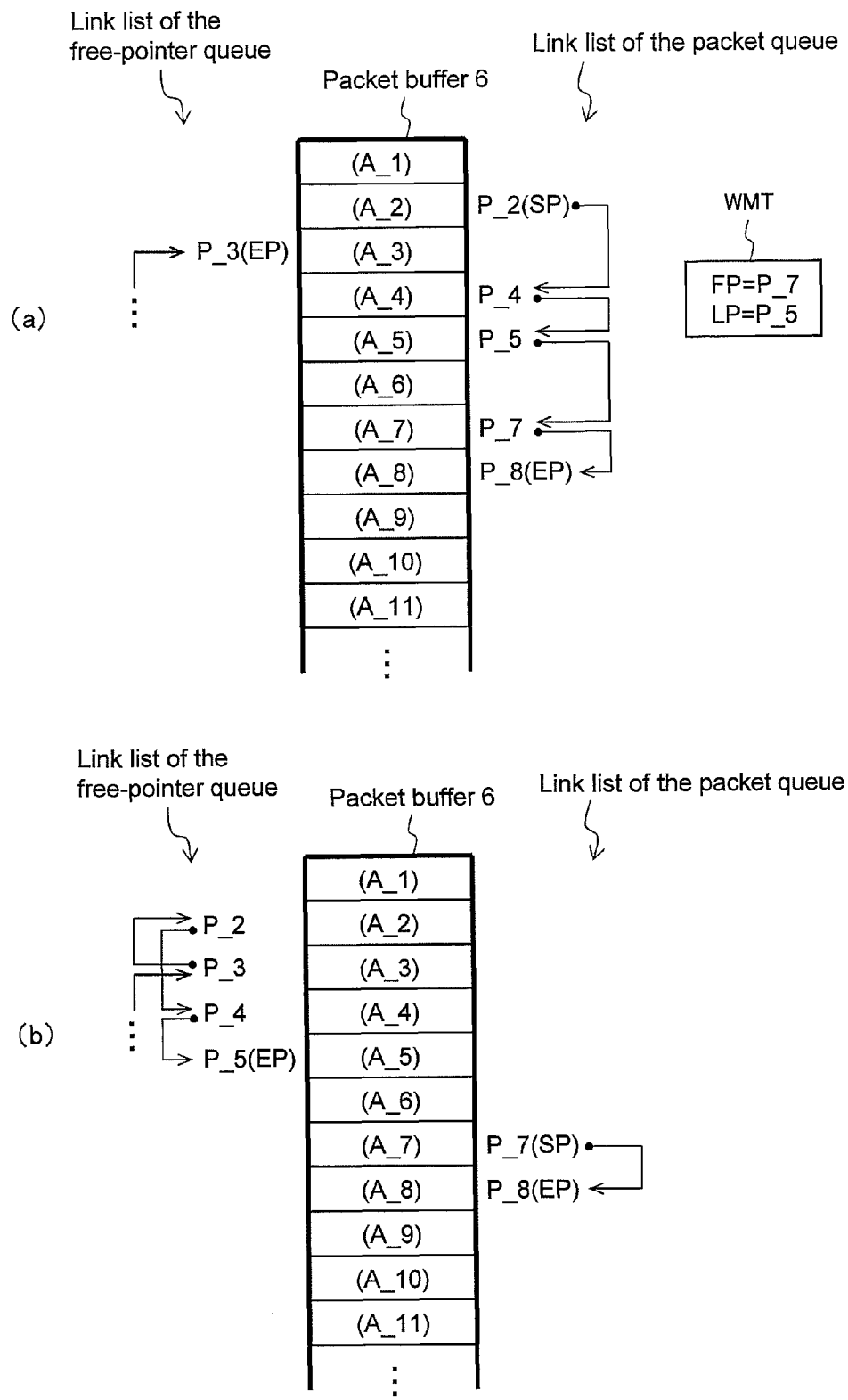
FIG. 13 is a diagram for describing an example of the link lists of a free-pointer queue and a packet queue before and after discarding packets in relation to the packet buffer in the case of discarding packets.

The operation of the packet buffer manager 5 in a packet read process will be described next with reference to FIGS. 2 and 10 to 13. The packet read process to be described below includes (1) a process when actually reading a packet and (2) a process when discarding a packet without reading the packet. In addition, FIGS. 10 and 11 are flow charts that show the operation of the packet buffer manager 5 in a packet read process. FIG. 12 is a diagram for describing an example of the link list of each of the queues before and after reading a packet in relation to the packet buffer, in a case that a packet is actually read. FIG. 13 is a diagram for describing an example of the link list of each of the queues before and after discarding packets in relation to the packet buffer, in a case of discarding packets.

(1) Process when Actually Reading a Packet

The flow chart in FIG. 10 will be described while referring to FIG. 2.

The read process at the read controller 20 is executed when triggered by a read request of a packet queue from the scheduler 25 for managing the band and the like of every packet queue, or when triggered by the change in the time data TM from the timer 40 (when the read period changes).

In FIG. 10, the read controller 20 executes a read process if there is a read request of a packet queue from the scheduler 25 or if there is a trigger input (YES in Step S201) based on the change in the time data TM (change or renewal of the read period) from the timer 40. In this read process, the process on and after Step S202 is performed on all the packet queues. However, only the process on a single packet queue will be described below.

The read controller 20 first reads the start pointer (SP) of a packet queue (Step S202) in order to judge about discarding a packet that has resided the longest in the packet buffer 6. The read controller 20 then determines (Step S203) if the address of the start pointer (SP) read in Step S202 is the front pointer (FP) in the write period corresponding to that start pointer (SP). If the start pointer (SP) is the front pointer (FP), the counter 21 is reset (Step S204).

Next, the read controller 20 refers to the delay threshold memory table 22 (DTT), reads the delay threshold corresponding to the packet queue (Step S205), and judges if the packet of the address of the packet buffer 6 corresponding to the start pointer (SP) is to be discarded (Step S206).

This discarding judgment is performed in the following way specifically. In other words, the read controller 20 first calculates a residence period of the packet of the address corresponding to the pointer, based on the difference between the write period corresponding to the start pointer (SP) of the packet queue and the present time data (present time) received from the timer 40. Next, the read controller 20 compares the calculated residence period and the delay threshold read in Step S203, and if the residence period does not exceed the delay threshold, it is judged that the packet should not be discarded (NO in Step S206).

Next, the read controller 20 judges whether or not the execution of the process made was triggered by the change of the read period (Step S207). In the case that the judgment is NO in Step S207, since this means that the execution was made triggered by a read request from the scheduler 25, a series of processes (Steps S207 through S211) when actually reading the packet subject to be read is performed. On the contrary, in the case that the judgment is YES in Step S207, the packet is not read. The execution of the read process that is made when triggered by the change of the read period is only for the purpose of discarding a packet.

In the case that the judgment is NO in Step S207, the read controller 20 makes the counter 21 count up (Step S208). The counter 21 is reset (Step S204) when the start pointer (SP) of the packet queue that is the subject of the process matches the front pointer (FP) in the corresponding write period, and since the counter 21 counts up when a packet is actually read, the count value of the counter 21 shows the number of packets read within the same write period.

Next, the read controller 20 refers to the pointer storage 30, specifies the address corresponding to the start pointer (SP) of the packet queue, and reads the packet from the packet buffer 6 (Step S209). This packet that is read is outputted from the packet buffer manager 5 as the packet PK_OUT (refer to FIG. 2).

Then, the read controller 20 returns the pointer that is read to the free-pointer queue corresponding to that pointer, that is, the free-pointer queue that the pointer was originally borrowed. By doing so, the pointer that is returned is connected to the link list of the free-pointer queue to which it is returned, and becomes the end pointer (EP) of that free-pointer queue (Step S210). In addition, after reading the packet, since it is necessary to disconnect the start pointer (SP) of the packet queue from the link list, the next pointer of the pointer address pointed by that start pointer will be the new start pointer (SP) of the packet queue (Step S211).

Every time there is a trigger input for the read process, the series of processes of Steps S202 through S211 are performed repeatedly. During the time that the packets read are those written in the same write period, the number of the packets read is counted by the counter 21.

(2) Process when Discarding without Reading a Packet

On the other hand, in Step S206, the read controller 20 compares the residence period and the delay threshold, and in the case that the residence period exceeds the delay threshold, it is judged that the packet should be discarded (YES in Step S206). As a result, the read controller 20 executes the processes of Steps S301 through S305 illustrated in FIG. 11.

The read controller 20 first specifies the write period corresponding to the start pointer (SP) that is judged to be discarded, accesses the write management table 50 (WMT), and reads the front pointer (FP), last pointer (LP), and the number of packets written (W_num) of the packet queue that is subject to the process (Step S301), in the period that is the next period of the specified write period (for example, write period WP2, if SP corresponds to the write period WP1; refer to FIG. 5).

Next, the start pointer (SP) of the packet queue is connected to the link list of the free-pointer queue corresponding to that pointer (Step S302), and the end pointer (EP) of that free-pointer queue becomes the last pointer (LP) read out in Step S301 (Step S303). As a result, on the link list of the packet queue, the start pointer and all of the pointers that were borrowed within the same write period are returned to the free-pointer queue. Furthermore, since the pointers that are returned are removed from the link list of the packet queue that is subject to the process, the start pointer (SP) of the packet queue becomes the front pointer (FP) that is read out in Step S301 (Step S304).

In addition, the read controller 20 calculates the number of the discarded packets (Step S305). The discarded packet number is obtained by subtracting the count value of the counter 21 (which is the number of packets read) from the number of packets written (W_num), which was read out in Step S301.

The operation flow of the packet buffer manager 5 during a packet read process was described above. Additionally, an example on the changes in the link lists of a free-pointer queue and a packet queue during a read process will be described specifically with reference to FIGS. 12 and 13. FIG. 12 shows the process when actually reading a packet, and FIG. 13 shows the process when discarding without reading packets. In both FIGS. 12 and 13, (a) shows the state before the process and (b) shows the state after the process.

Both in FIGS. 12 and 13, as an example of a packet queue, assumed a case that, in the state before the process, the link list is formed by pointers represented by P_2 (SP)→ P_4→P_5→P_7→P_8 (EP). Furthermore, in FIG. 13, assume a case that P_7 is recorded in the write management table 50 (WMT) as the front pointer (FP) and P_5 as the last pointer (LP), in the period that is the next period of the write period corresponding to the start pointer (SP), which is judged to be discarded. In this example, since the last pointer (LP) is P_5, P_2 (SP), P_4, and P_5 were borrowed within the same write period.

In this case, as illustrated in FIG. 12, in the process when actually reading a packet, by performing the processes of Steps S207 through S209 in FIG. 10, the packet of address A_2 of the packet buffer 6 corresponding to P_2, which is the start pointer (SP) of the packet queue, is read. Then, P_2 is returned to the free-pointer queue as the new end pointer (EP).

On the other hand, as illustrated in FIG. 13, in the process when discarding without reading packets, by performing the processes of Steps S302 through S304 in FIG. 11, all of the pointers from the start pointer P_2 to P_5, which is the last pointer (LP) of the previous period, on the link list of the packet queue are returned to the free-pointer queue. Then, since the pointers returned are removed from the packet queue, P_7, which is the front pointer (FP) of the present period, becomes the new start pointer (SP) of the packet queue. Through these processes, the packets of the addresses (A_2, A_4, and A_5) of the packet buffer 6 corresponding to the returned pointers (P_2, P_4, and P_5) are not read, and newly received packets can be overwritten in these addresses in a later packet write process.

[Overall Process in the Packet Buffer Manager 5]

Figure 14:
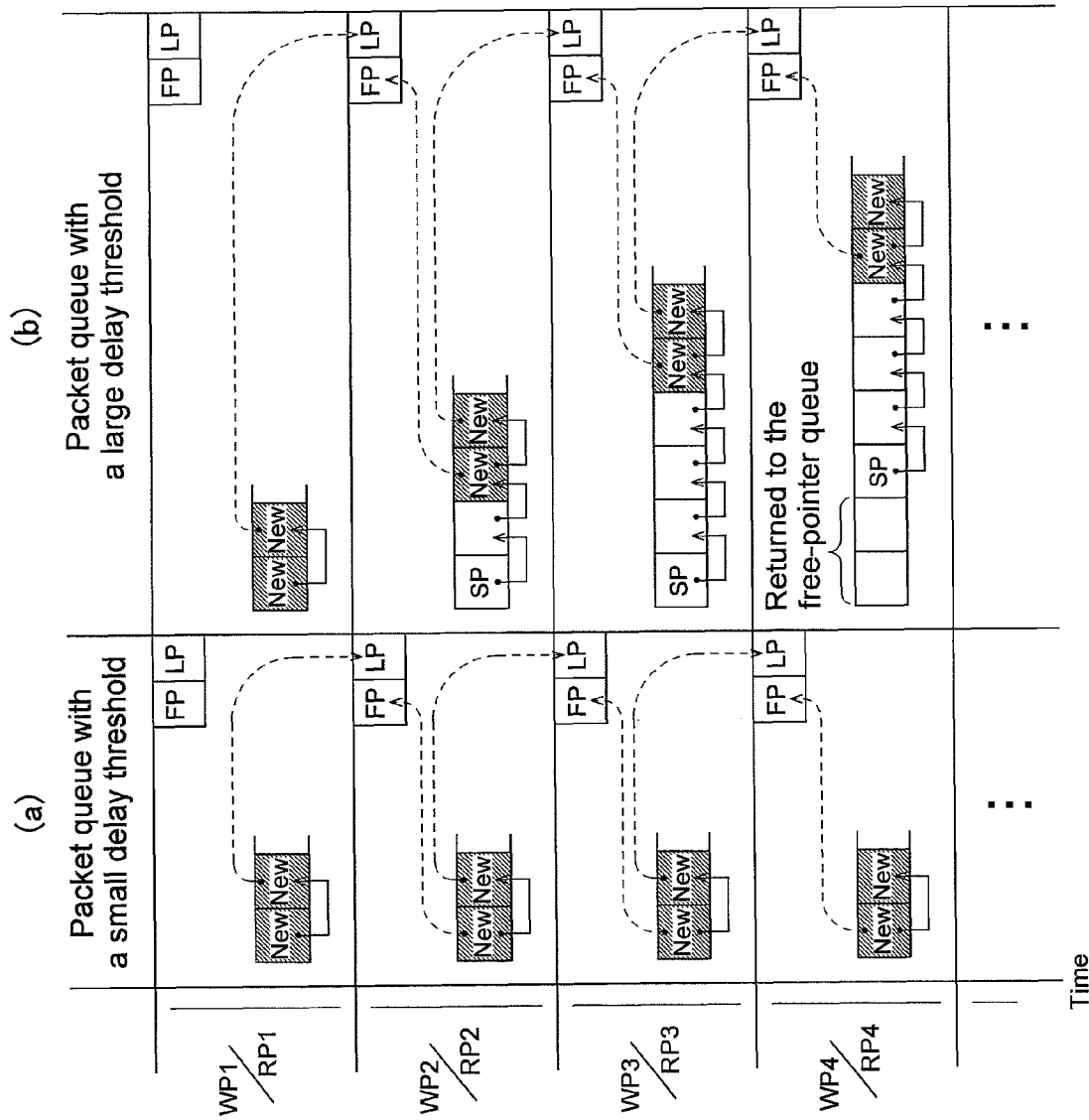
FIG. 14 is a diagram showing an example of the changes in a time-series packet queue, along with the overall process of the packet buffer manager.

Next, the overall process of the packet buffer manager 5 will be described with reference to FIG. 14. FIG. 14 is a diagram that shows an example of the changes in a time-series packet queue along with the overall process of the packet buffer manager 5, and (a) shows the case when the delay threshold of a packet queue is small and (b) shows the case when the delay threshold of a packet queue is large.

In addition, in FIG. 14, the write periods (each 1 ms) pass in WP1→WP2→WP3→WP4→ . . . and the read periods (each 1 ms) pass in RP1→RP2→RP3→RP4→ . . . . The pointers with "New" written indicate pointers that are newly borrowed from the free-pointer queue in that period, as new packets are being written in each of the write periods. Furthermore, in FIG. 14, when recording the front pointer (FP) and the last pointer (LP) in each period, the way that the pointers from the packet queue are reflected is represented by dashed lines.

The delay threshold for the packet queue illustrated in (a) of FIG. 14 is set to be 1 ms, for instance. In this example, since the packets written are read in order within 1 ms, in the packet queue of each period, the packet queue is formed from the start pointer by new packets constantly. Therefore, in each period, the residence period based on the start pointer of the packet queue is constantly not over the delay threshold, and packets are not discarded.

Meanwhile, the delay threshold for the packet queue illustrated in (b) of FIG. 14 is set to be 2 ms, for instance. In this example, packets are not read in the read periods RP1 through RP3, and new packets are written in order in the write periods WP1 through WP3. As a result, in the write periods WP1 through WP3, pointers borrowed from the free-pointer queue are connected in order to the link list of the packet queue.

In the read period RP3, the residence period based on the start pointer (SP) of the packet queue exceeds the delay threshold, and therefore, it is judged that packets should be discarded. As a result, all the pointers borrowed within the write period (in this case, write period WP1) corresponding to the start pointer (SP) of this period are returned. Then, the start pointer in the read period RP4 becomes the front pointer (FP) of the write period WP2, which is the period that follows the write period WP1 in which the start pointer (SP) is judged to be discarded.

As described above, with the packet forwarding apparatus 1 of this embodiment, when discarding a packet residing in the packet buffer, the packet is actually not read from the packet buffer, and the process is done by renewing the packet queue corresponding to that packet. More specifically, the pointer corresponding to the address of the packet buffer of that packet is disconnected from the link list of the packet queue and returned to the free-pointer queue. By doing so, it becomes possible to write (overwrite) a packet in the address corresponding to the returned pointer. Therefore, with this packet forwarding apparatus 1, packets that are to be discarded are not read from the packet buffer unnecessarily, and it is possible to effectively use the data forwarding capacity (band) that is for reading packets.

In addition, with this packet forwarding apparatus 1, during a packet write process, the write period and the free-pointer queue out of a plurality of free-pointer queues from which pointers are to be borrowed are being associated. Therefore, during a packet read process, by referring to the pointer address of the pointer borrowed from the free-pointer queue, it is possible to later recognize the write period of the packet that was written in the address corresponding to that pointer. For this reason, with this packet forwarding apparatus 1, it is possible to calculate a residence period of the packet in the packet buffer, even if the time that the packet is written is not stored in a memory inside the apparatus (or in the packet itself). Therefore, with this packet forwarding apparatus 1, it is not necessary to have a memory for storing the time data (time written or time received, and the like) for each packet.

Second Embodiment

Below, another embodiment of the packet forwarding apparatus of the present invention will be described, especially on the points different from that of the first embodiment, with reference to the drawings. A packet forwarding apparatus 1' according to the present embodiment has an overall configuration that is the same as the one in the first embodiment illustrated in FIG. 2. However, the configuration of the free-pointer queues and the packet queues in the pointer storage 30 is different from that of the first embodiment. In addition, in the second embodiment, the write controller and the read controller correspond to a third controller and a fourth controller of the present invention, respectively.

The configuration of the packet buffer manager 5 in this embodiment will be described below, centering on the differences from that of the first embodiment. First, the configuration of the free-pointer queues and the packet queues in this embodiment will be described, respectively, with reference to FIGS. 15 and 16.

[Free-Pointer Queue]

Figure 15:
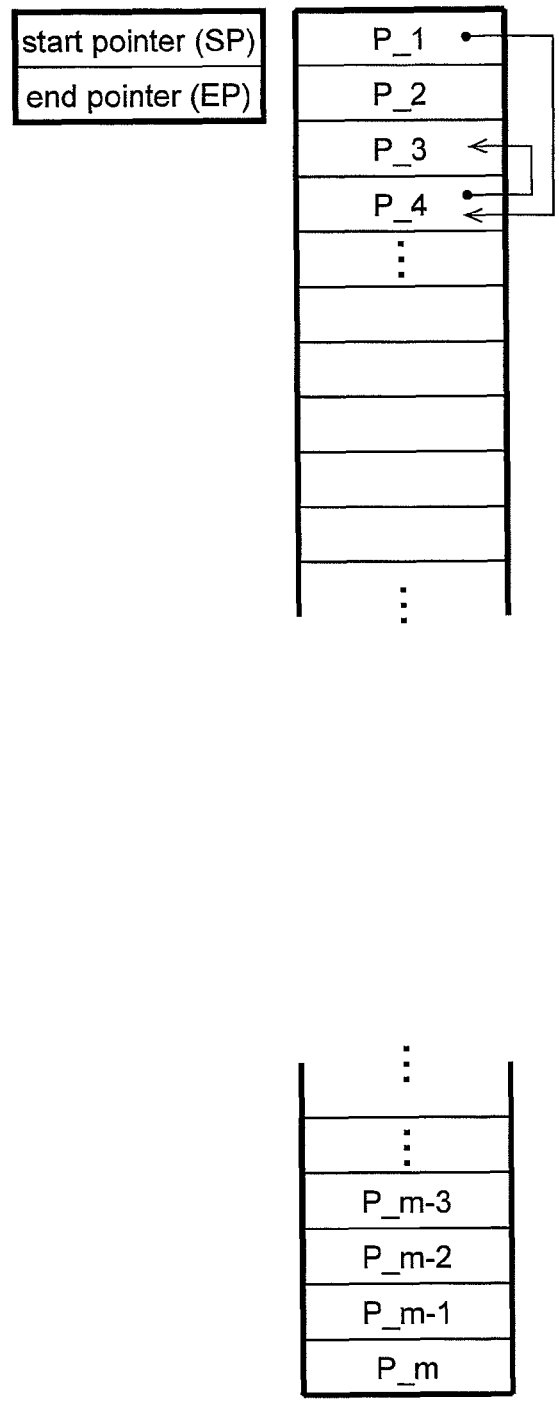
FIG. 15 is a diagram for describing the configuration of a free-pointer queue in a packet forwarding apparatus in accordance with a second embodiment in relation to the packet buffer.
Figure 15:
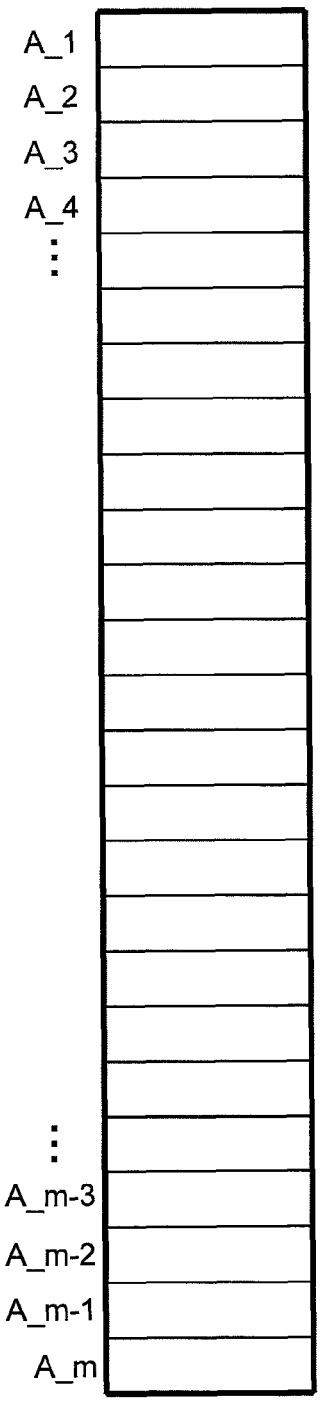

FIG. 15 is a diagram for describing the configuration of the free-pointer queue in the second embodiment in relation to the packet buffer 6, and (a) shows the configuration of the free-pointer queue and (b) shows the configuration of the packet buffer 6. Same as the one illustrated in FIG. 3, each pointer address of the pointer storage 30 in the second embodiment is associated with an address of the packet buffer 6. Different from the one illustrated in FIG. 3, in the second embodiment, the order of writing to the addresses of the packet buffer 6 is managed by a single free-pointer queue (third queue).

[Packet Queues]

Figure 16:
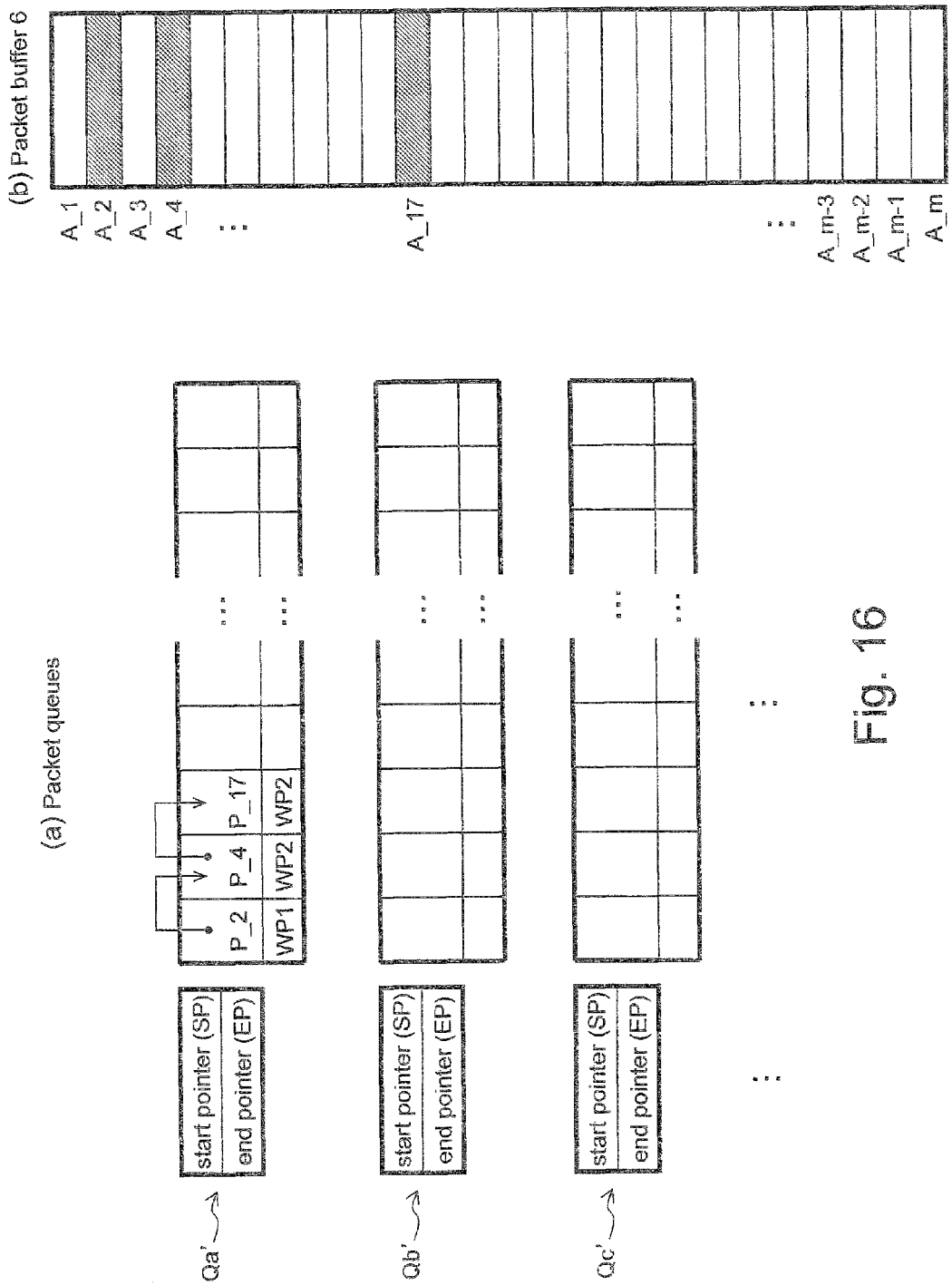
FIG. 16 is a diagram for describing the configuration of packet queues in the packet forwarding apparatus in accordance with the second embodiment in relation to the packet buffer.

FIG. 16 is a diagram for describing the configuration of the packet queues in the second embodiment, in relation to the packet buffer 6, and (a) shows the configuration of the packet queues and (b) shows the configuration of the packet buffer 6. As illustrated in FIG. 16, in the second embodiment, a plurality of packet queues Qa', Qb', Qc', . . . (a plurality of fourth queues) are provided. In each of the packet queues Qa', Qb', Qc', . . . , the way that the link list is formed by the pointers and shows the order for reading the addresses of the packet buffer that have been written, corresponding to the property of the packets, is the same as that of the first embodiment. On the other hand, different from that of the first embodiment, in the packet queues of the present embodiment, along with the link list formed by the pointers, the information on the write periods (WP1, WP2, . . . ) when the pointers on the link list are borrowed (which is when the packets are written) is added.

Next, the operation of the packet buffer manager 5 in this embodiment will be described, centering on the differences thereof from that of the first embodiment.

[Packet Write Process]

The write controller 10 writes packets in the addresses of the packet buffer 6 corresponding to the pointers on the link list of the free-pointer queue during a packet write process. The borrowing of pointers from a single free-pointer queue for the writing of the packets is performed sequentially. Different from the case in the first embodiment, in the second embodiment, in the different write periods, pointers are borrowed according to the order indicated by the free-pointer queue, and always from one single free-pointer queue. In addition, different from the case in the first embodiment, in a packet write process, along with the link list, information on the write periods is added (refer to FIG. 16) in the packet queue associated with the pointers on the link list.

[Packet Read Process]

The packet read process in this embodiment is different from that of the first embodiment in the way that the residence period is calculated. More specifically, the read controller 20 calculates the residence period of a packet from the difference between the write period (refer to FIG. 16) added to the start pointer of the packet queue and the present time, during a packet read process. The delay threshold memory table 22 is being referred, in judging the discarding of a packet based on this residence period, same as the case in the first embodiment.

The process when actually reading a packet and the process when discarding without reading a packet are same as those of the first embodiment. That is, also in the packet forwarding apparatus 1' of this second embodiment, same as that of the first embodiment, when discarding a packet residing in the packet buffer, the packet is not actually read from the packet buffer, and the process is done by renewing the packet queue corresponding to the packet. At this time, the start pointer of the packet queue and all the pointers borrowed within the same write period are returned to the free-pointer queue.

However, in this embodiment, this process can be executed easily by referring to the information on the write period of each pointer that is added to the packet queue.

Therefore, also in the packet forwarding apparatus of this embodiment, packets to be discarded are not read from the packet buffer unnecessarily, and the data forwarding capacity (band) for reading packets can be effectively used.

Examples of Modifications of the Embodiments

The packet forwarding apparatus according to each of the above described embodiments is only an illustration of an example, and based on the description above, it is possible to make improvements or changes like those explained below.
[Time-Sharing Processing of Packet Queues]

Figure 17:
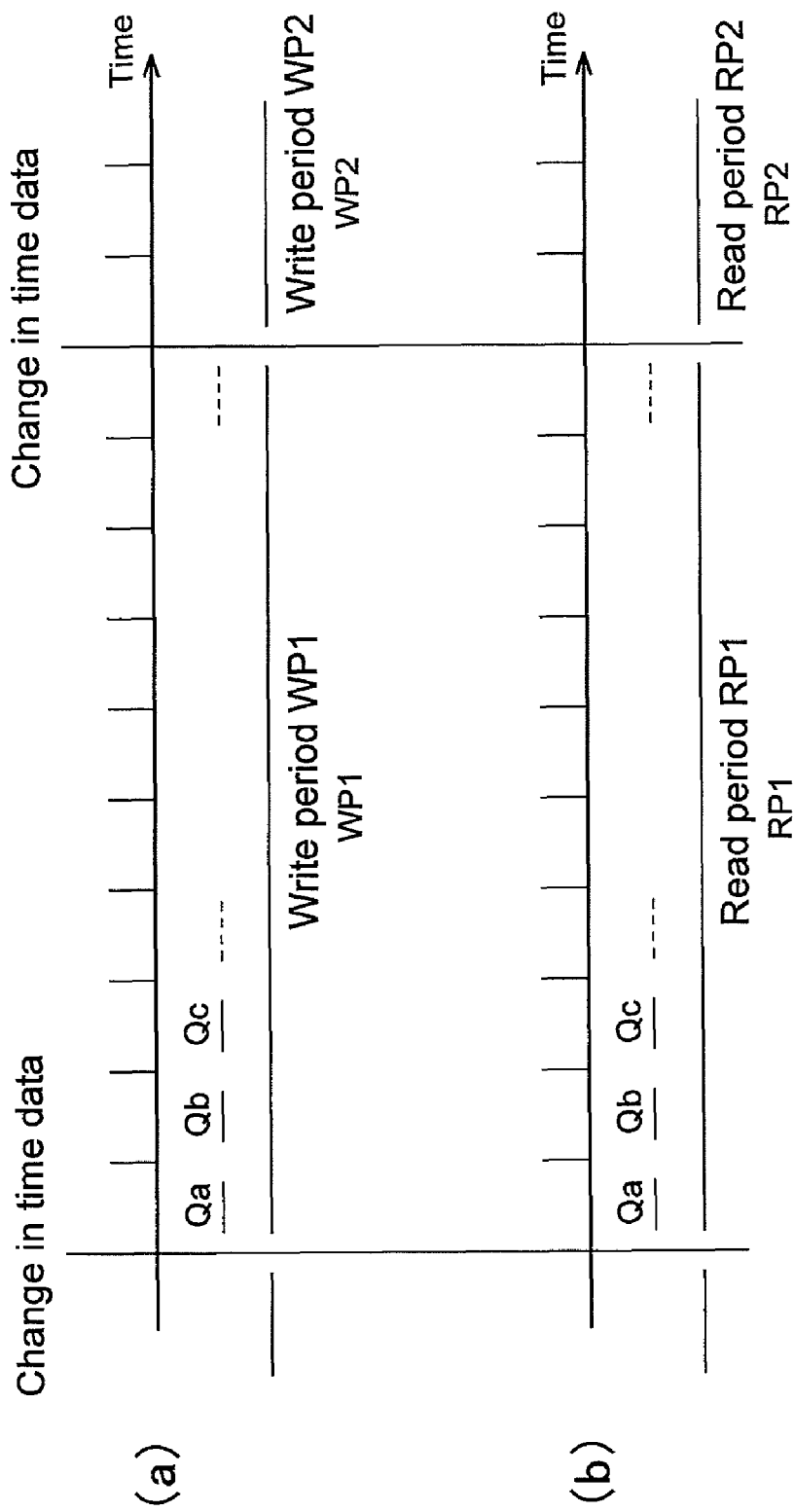
FIG. 17 is a diagram showing the time-series processing with respect to the packet queues.

First, the preferred processing method in the packet forwarding apparatus of each of the embodiments will be described with reference to FIG. 17. FIG. 17 is a diagram showing the time-series processing with respect to the packet queues, and (a) shows the case of the write process and (b) shows the case of the read process. As illustrated in FIG. 17, in the packet forwarding apparatus of each of the embodiments, in each write period or each read period, it is preferable to perform time-sharing processing on the plurality of packet queues (Qa, Qb, Qc, . . . in FIG. 17). By this processing, along with the packet write process and the packet read process (including discarding packets), pointer processing with respect to the plurality of packet queues is distributed within a unit period, and the processing burden on the packet buffer manager is relaxed.
[Priority Processing of Packet Queues]

In the packet forwarding apparatus of each of the embodiments, along with the packet write process and the packet read process (including discarding packets), it is preferable that the pointer processing with respect to the plurality of packet queues is executed from the packet queue with a high priority. For example, it is preferable to judge the discarding of packets in order based on the start pointer of the packet queue that has a high priority, out of the plurality of packet queues.

The processing based on the priority of the packet queues will be further described with reference to FIG. 18.

Figure 18:
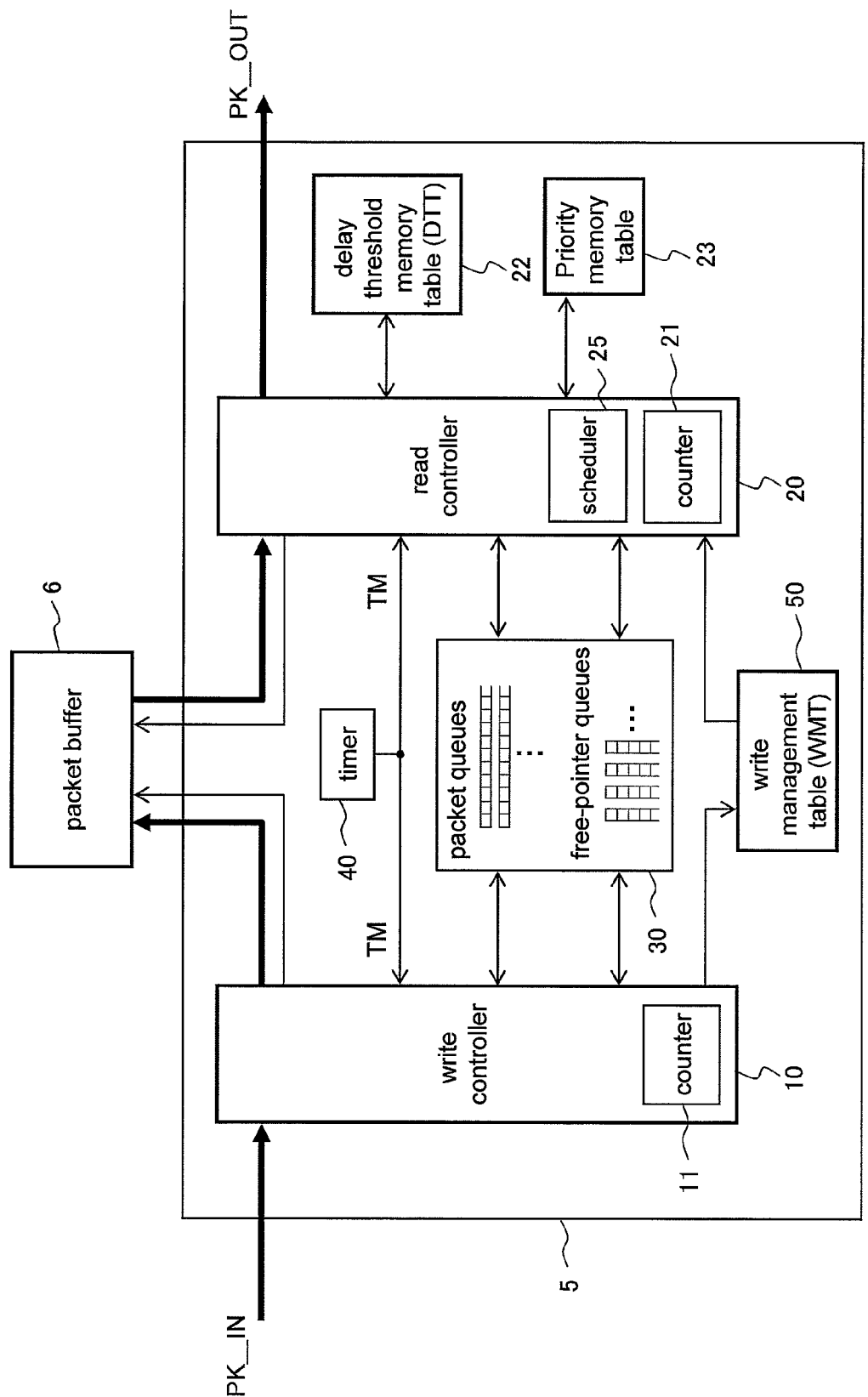
FIG. 18 is a block diagram showing the configuration of a packet buffer manager including a priority memory table.

FIG. 18 is a block diagram showing the configuration of the packet buffer manager 5 including a priority memory table 23. In this priority memory table 23, the corresponding relationship between the plurality of packet queues and the priority of each of the packet queues is described. Each packet queue is associated with, for example, the class and the like based on the VLAN control information described in a packet, and the property of the packet, and therefore, this priority memory table practically describes the relationship between the property of the packet and the priority thereof.

It is generally preferable, but not limited, that the smaller the delay threshold, the higher that the priority of a packet queue is set, for each of the packet queues in the priority memory table 23. For example, in the case that the same delay threshold is set for two or more packet queues, the priority may be set to be different based on the difference in the property of the packets associated with the packet queues.

In the packet buffer manager 5 having a configuration illustrated in FIG. 18, the priority memory table 23 is being referred in the case that the read controller 20 judged that packets should be discarded with respect to two or more packet queues. The read controller 20 then performs the process (the series of processes illustrated in FIG. 11) on the two or more packet queues in the order from the one with the highest priority.

Here, the burden of the processing (refer to FIGS. 11 and 13) with respect to the link list of the packet queue when discarding packets is large, and one needs to be careful that a subsequent processing cannot be performed since the start pointer of the packet queue will not be renewed if this processing is not finished. In view of this, as described above, by performing the processing in the order of the packet queues according to their priority, a packet queue with a high priority is given priority in this processing, and it is possible to quickly output (forward) packets corresponding to packet queues with high priority from the apparatus.
[Other Examples of Modifications]

With the packet forwarding apparatus of each of the embodiments, although the case that a packet is associated with one of the plurality of packet queues depending on the priority of the packet was described, it is not limited to this. The same effects and results can be obtained even with the case of a packet forwarding apparatus using a single packet queue.

With the packet forwarding apparatus of the first embodiment, although an example of each address group of the packet buffer 6 formed in the order of the addresses was explained, it is not limited to this kind of a configuration. If the address groups of the packet buffer for writing packets can be switched in every unit period, it is not necessary to have each address group form from a plurality of addresses in ascending order, and only have to form each address group from a plurality of addresses that is defined in advance.

With the packet forwarding apparatus of the first embodiment, although the case of having the unit period for the measurement of the timer set to be 1 ms, and having the maximum delay period allowed for a packet set to be 128 ms was described as an example, setting is not limited to this example. More generally, when the unit period for the measurement of the timer is set to be T1, and the maximum delay period allowed for a packet is set to be T2, the number of free-pointer queues provided only has to be equal to or greater than T2/T1. Therefore, in a write period, a pointer borrowed from the free-pointer queue corresponding to that period will be returned before the next write period in which the free-pointer queue is used. For this reason, as long as the number of free-pointer queues provided is equal to or greater than T2/T1, the situation will not occur in which a pointer cannot be borrowed from a free-pointer queue.

With the packet forwarding apparatus of each of the embodiments, although the case that queues for the addresses of the packet buffer for the writing and reading of packets managed by link lists through the pointers was described, it is not limited to this. Using link lists through the pointers is only one solution for managing the order of the addresses (queues of the addresses) of the packet buffer. To manage the order of the addresses of the packet buffer, any type of other publically known data structure for realizing FIFO (First-In-First-Out) can also be utilized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A packet forwarding apparatus, comprising:

a packet buffer for temporarily storing packets to be forwarded;

a timer for measuring the time of every predetermined unit period;

a plurality of pointers with pointer addresses corresponding to each address of the packet buffer;

a plurality of first queues, each first queue corresponding to each of a plurality of address groups that form the packet buffer, each first queue being formed by a link list through pointers corresponding to addresses, out of the corresponding address groups, to which packets can be written and managing an order of writing packets into addresses in the corresponding address group;

a plurality of second queues, each second queue corresponding to a property of packets, each second queue managing an order for reading packets from the addresses of the packet buffer which packets have been written into;

a first controller for associating each address group with a write period by switching an address group to be written into in every predetermined unit period such that the address group to be written into is different for each of consecutive write periods, the number of which is identical to the number of the plurality of address groups, the first controller writing packets into addresses in the address group to which the packets are to be written according to the order indicated by the first queue corresponding to the address group, and adding the addresses into which the packets have been written to a second queue that corresponds to the property of the packets, the first controller being configured to write packets into addresses of the packet buffer corresponding to the pointers on the link list of the first queue corresponding to the write period at a time when writing packets, disconnect the pointers from the link list of the first queue, and form the second queue through the pointers as a link list formed by the pointers; and a second controller for calculating a residence period of the packet of the address corresponding to a start pointer of the second queue based on a first write period to which an address group including the address corresponding to the start pointer of the second queue and a present time indicated by the timer, and removing all addresses having packets written within the first write period from the second queue when the packet is determined to be discarded based on the residence period thereof by disconnecting all pointers connected to the second queue that are in the same write period as a start pointer of the second queue, connecting the pointers to the first queue, setting a front pointer of the following period as new start pointer of the second queue.

2. The packet forwarding apparatus according to claim 1, further comprising:

a first counter for counting the number of packets written to the packet buffer within a period; and a second counter for counting the number of packets read from the packet buffer, out of the packets written in the packet buffer within said period, wherein the number of packets discarded in said period is calculated by subtracting the value counted by the second counter from the value counted by the first counter.

3. The packet forwarding apparatus according to claim 1, wherein a priority for each of the plurality of second queues is set in advance based on the property of the packets; and when the discarding of packets in a period is determined based on two or more second queues, a process with respect to the two or more second queues in the period is performed according to the priority.

4. The packet forwarding apparatus according to claim 1, wherein a process of the first controller with respect to the plurality of the second queues and a process of the second controller with respect to the plurality of the second queues are performed by time-sharing within the predetermined unit period.

5. The packet forwarding apparatus according to claim 1, wherein a delay threshold that is compared with the residence period when determining about the discarding of a packet is set in advance for each of the plurality of second queues.

6. The packet forwarding apparatus according to claim 1, wherein when the predetermined unit period is set to be T1 and the maximum delay period allowed for a packet is set to be T2, the number of the first queues provided is equal to or above T2/T1.

7. A method for discarding packets for a packet forwarding apparatus comprising a packet buffer for temporarily storing packets to be forwarded, and a timer for measuring the time of every predetermined unit period, the method for discarding the packets comprising:

providing a plurality of pointers with pointer addresses corresponding to each address of the packet buffer;

providing a plurality of first queues, each first queue corresponding to each of a plurality of address groups that form the packet buffer, each first queue being formed by a link list through pointers corresponding to addresses, out of the corresponding address groups, to which packets can be written and managing an order of writing packets into addresses in the corresponding address group;

providing a plurality of second queues, each corresponding to a property of the packets;

switching an address group to be written into in every predetermined unit period to associate each address group with a write period such that the address group to be written into is different for each of consecutive write periods, the number of which is identical to the number of the plurality of address groups, and writing packets into addresses in the address group to which the packets are to be written according to the order indicated by the first queue corresponding to the address group;

adding the addresses into which the packets have been written to a second queue that corresponds to the property of the packets, the first controller being configured to write packets into addresses of the packet buffer corresponding to the pointers on the link list of the first queue corresponding to the write period at a time when writing packets, disconnect the pointers from the link list of the first queue, and form the second queue through the pointers as a link list formed by the pointers;

calculating a residence period of the packet of the address corresponding to a start pointer of the second queue based on a first write period to which an address group including the address corresponding to the start pointer of the second queue and a present time indicated by the timer; and removing all addresses having packets written in the first write period from the second queue when the packet is determined to be discarded based on the residence period thereof by disconnecting all pointers connected to the second queue that are in the same write period as a start pointer of the second queue, connecting the pointers to the first queue, setting a front pointer of the following period as new start pointer of the second queue.

* * * * *